US012652428B2

(12) United States Patent
Chen

(10) Patent No.: US 12,652,428 B2
(45) Date of Patent: Jun. 9, 2026

(54) METHODS AND SYSTEMS TO IMPROVE SEGMENT BITRATE SELECTION IN ABR STREAMING

(71) Applicant: Adeia Guides Inc., San Jose, CA (US)

(72) Inventor: Tao Chen, Palo Alto, CA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/736,867

(22) Filed: Jun. 7, 2024

(65) Prior Publication Data

US 2025/0380018 A1     Dec. 11, 2025

(51) Int. Cl.
 *H04N 21/2662*     (2011.01)
 *H04N 21/234*     (2011.01)
 *H04N 21/24*     (2011.01)
(52) U.S. Cl.
 CPC ... *H04N 21/2662* (2013.01); *H04N 21/23406* (2013.01); *H04N 21/2402* (2013.01)
(58) Field of Classification Search
 CPC ......... H04N 21/2662; H04N 21/23406; H04N 21/2402
 See application file for complete search history.

(56) References Cited

U.S. PATENT DOCUMENTS

| | | | |
|---|---|---|---|
| 9,264,475 B2 | 2/2016 | Shivadas et al. | |
| 9,386,308 B2 | 7/2016 | Li et al. | |
| 11,076,187 B2 | 7/2021 | Kalagi et al. | |

| | | | | |
|---|---|---|---|---|
| 11,232,686 | B2 * | 1/2022 | Pettersson | ........ G08B 13/19604 |
| 2014/0019593 | A1 | 1/2014 | Reznik et al. | |
| 2019/0334803 | A1 * | 10/2019 | Ickin | ................ H04N 21/44209 |
| 2020/0204842 | A1 * | 6/2020 | Kapchits | ........ H04N 21/234363 |
| 2021/0029396 | A1 * | 1/2021 | Ramaley | .............. H04L 65/612 |
| 2021/0067818 | A1 | 3/2021 | Sen et al. | |
| 2021/0067819 | A1 | 3/2021 | Sen et al. | |
| 2022/0078517 | A1 | 3/2022 | Kumar et al. | |
| 2022/0272413 | A1 * | 8/2022 | Hallmarker | ...... H04N 21/44209 |
| 2022/0385717 | A1 | 12/2022 | Wang et al. | |
| 2023/0247205 | A1 * | 8/2023 | Gillis | ................ H04N 21/8456 |
| | | | | 375/240.03 |

(Continued)

OTHER PUBLICATIONS

"Video Streaming: Reducing Stalls with Adaptive Bitrate", SpeakOfTheDevrel.Cloud: Doug Sillars, Oct. 5, 2017, 6 pages.

(Continued)

*Primary Examiner* — Oanh Duong
(74) *Attorney, Agent, or Firm* — HG LAW LLP

(57) ABSTRACT

Methods and systems, e.g., implemented by a client device, are provided for requesting a segment of a media content item using adaptive bitrate (ABR) streaming so as to improve the latter. To do so, a client device determines a first segment bitrate based on an available bandwidth. The client device then determines that a second segment bitrate is available, the second segment bitrate being lower than the first segment bitrate, and that a video quality of the segment of the media content item requested at the second segment bitrate is within a video quality variation range. Based on the determining that the video quality of the segment of the media content item requested at the second segment bitrate is within the video quality variation range, the client device requests the segment of the media content item at the second segment bitrate.

20 Claims, 9 Drawing Sheets

(56)  References Cited

U.S. PATENT DOCUMENTS

| | | | |
|---|---|---|---|
| 2023/0254533 A1* | 8/2023 | Le Scouarnec | ............................. H04N 21/440227 725/86 |
| 2023/0300391 A1* | 9/2023 | Kapchits | .............. H04L 65/752 709/231 |
| 2024/0007517 A1* | 1/2024 | Manchester | ....... H04N 21/2662 |

OTHER PUBLICATIONS

Bentaleb, A., et al., "BoB: Bandwidth Prediction for Real-Time Communications Using Heuristic and Reinforcement Learning", IEEE Transactions on Multimedia, vol. 25, Jan. 2022, 16 pages.

Dahl, J., "The four elements of video performance", MUX, available online at: <https://www.mux.com/blog/the-four-elements-of-video-performance>, Aug. 18, 2016, pp. 11.

Zou, X. K., et al., "Can Accurate Predictions Improve Video Streaming in Cellular Networks?", Proceedings of the 16th International Workshop on Mobile Computing Systems and Applications, Feb. 2015, pp. 57-62.

* cited by examiner

Fig. 1B

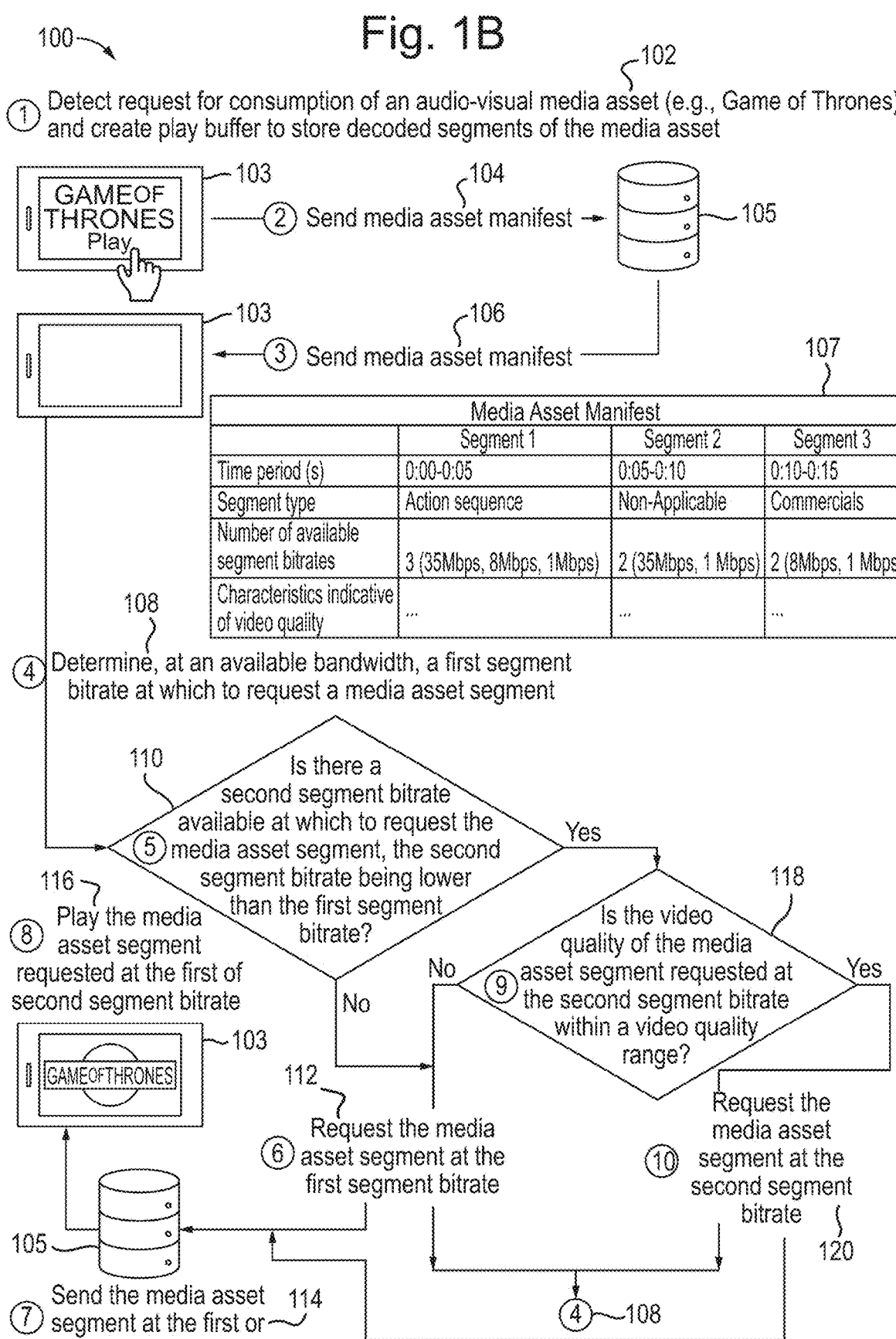

100 ⟍

① Detect request for consumption of an audio-visual media asset (e.g., Game of Thrones) and create play buffer to store decoded segments of the media asset

102

GAMEOF THRONES Play — 103

② Send media asset manifest → 104

105

103

③ Send media asset manifest ← 106

107

| Media Asset Manifest | | | |
|---|---|---|---|
| | Segment 1 | Segment 2 | Segment 3 |
| Time period (s) | 0:00-0:05 | 0:05-0:10 | 0:10-0:15 |
| Segment type | Action sequence | Non-Applicable | Commercials |
| Number of available segment bitrates | 3 (35Mbps, 8Mbps, 1Mbps) | 2 (35Mbps, 1 Mbps) | 2 (8Mbps, 1 Mbps) |
| Characteristics indicative of video quality | ... | ... | ... |

108

④ Determine, at an available bandwidth, a first segment bitrate at which to request a media asset segment

110

⑤ Is there a second segment bitrate available at which to request the media asset segment, the second segment bitrate being lower than the first segment bitrate?    Yes

118

116

⑧ Play the media asset segment requested at the first of second segment bitrate

No

No

⑨ Is the video quality of the media asset segment requested at the second segment bitrate within a video quality range?    Yes

GAMEOFTHRONES — 103

112

⑥ Request the media asset segment at the first segment bitrate

120

⑩ Request the media asset segment at the second segment bitrate

105

⑦ Send the media asset segment at the first or second segment bitrat e    114

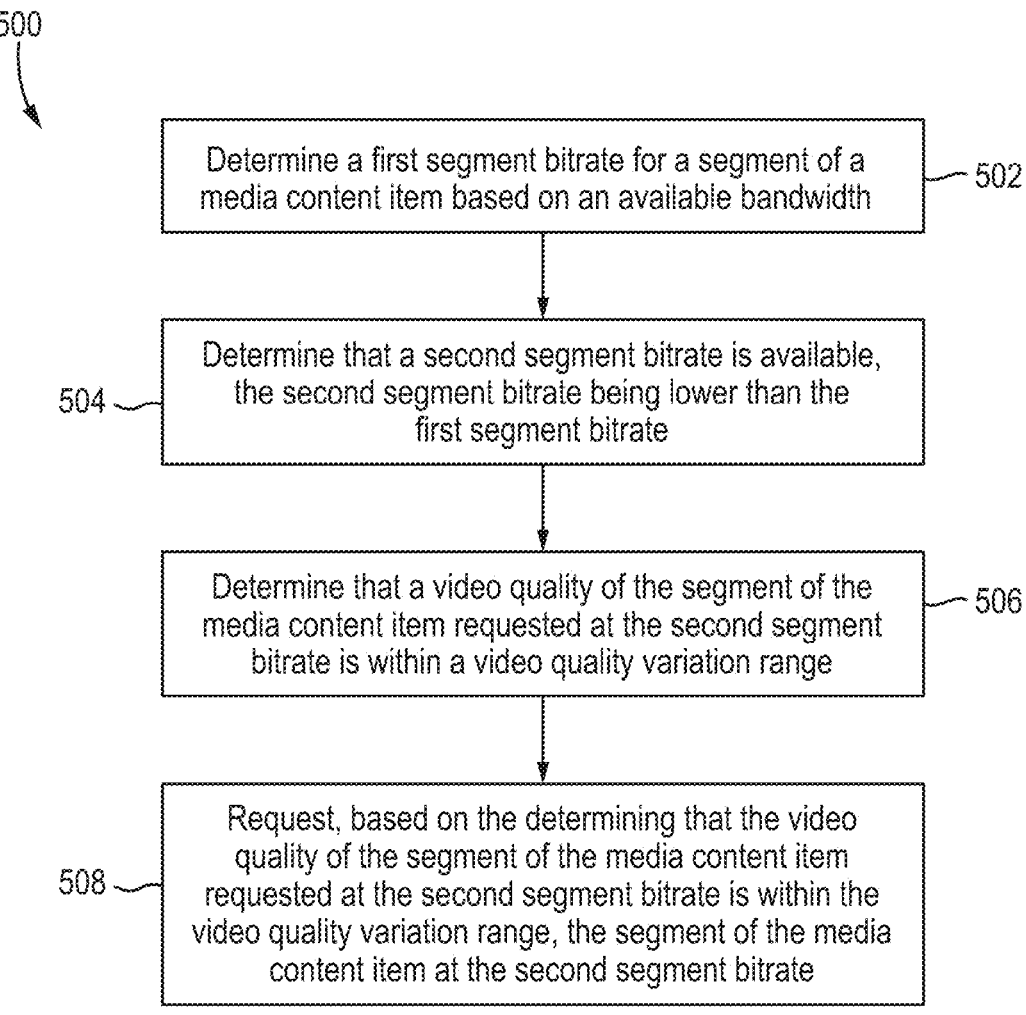

500

Determine a first segment bitrate for a segment of a media content item based on an available bandwidth ⟞ 502

Determine that a second segment bitrate is available, the second segment bitrate being lower than the first segment bitrate — 504

Determine that a video quality of the segment of the media content item requested at the second segment bitrate is within a video quality variation range ⟞ 506

Request, based on the determining that the video quality of the segment of the media content item requested at the second segment bitrate is within the video quality variation range, the segment of the media content item at the second segment bitrate — 508

┌─────────────────────────────────────────────┐
│ Determine a first segment bitrate for a segment of a │ ─ 602
│ media content item based on an available bandwidth │
└─────────────────────────────────────────────┘

┌─────────────────────────────────────────────┐
│ Determine that a second segment bitrate is available, │
604 ─│ the second segment bitrate being lower than the first │
│ segment bitrate │
└─────────────────────────────────────────────┘

┌─────────────────────────────────────────────┐
│ Determine a video quality of the segment of the media │ ─ 606
│ content item requested at the second segment bitrate │
└─────────────────────────────────────────────┘

┌─────────────────────────────────────────────┐
│ Retrieve, from a manifest comprising information about │
608 ─│ a plurality of segments of the media content item, a video │
│ quality of at least one segment previously requested │
└─────────────────────────────────────────────┘

610

┌─────────────────────────────┐
│ Determine a type of the segment │
│ of the media content item │
└─────────────────────────────┘

( A )

METHODS AND SYSTEMS TO IMPROVE SEGMENT BITRATE SELECTION IN ABR STREAMING

BACKGROUND

The present disclosure relates to methods and systems for improving bitrate selection in adaptive bitrate (ABR) streaming.

SUMMARY

ABR streaming involves encoding, using a codec, different versions of a media content item and segmenting each version into segments (e.g., of a few seconds each). Each version of a media content item is of a respective video quality defined by the amount of audio-visual data representing each frame of a version. The encoding and segmenting allow for compressing the audio-visual data of each frame and setting the segment size corresponding to the audio-visual data of multiple frames so as to ease the forwarding, via a communication network, of the audio-visual data from a server to a client device. There is thus a plurality of alternative segments representative of a same or similar portion (e.g., segment) of a media content item, each alternative segment exhibiting a respective amount of compressed audio-visual data. For example, each alternative segment representative of a given portion (e.g., a segment) of a media content item may have a different segment bitrate. The alternative segments for the given portion (e.g., a segment) of a media content item may be ordered on an ABR streaming ladder following their bitrate magnitude, from the highest magnitude to the smallest magnitude. Information (e.g., address on a server, time period, segment bitrate, etc.) related to a segment of a version of a media content item is indicated in a manifest relating to the media content item.

In some approaches, a client device requests, from a server, a media content item for presentation. The server then sends, to the client device, a manifest relating to the requested media content item, which e.g., indicates the location or address of the segments of the versions of the requested media content item. The client device then requests, from the server, each segment at the highest available segment bitrate that does not exceed the available bandwidth, and keeps checking during the buffering of each requested segment whether the time period required for buffering each requested segment does not exceed the time point at which each requested segment is due to be decoded and presented on the client device.

Because of network bandwidth variability over time, the client device may keep requesting and buffering segments of different segment bitrates. In effect, at times, the client device may detect that the current bandwidth is not sufficient to complete the buffering of an entire requested segment at a first segment bitrate before the time point at which the being-buffered segment is due to start being presented. Typically, if the current bandwidth does not increase, a playback stall will occur, which may lower a video quality of experience (QoE), for the user, associated with the presentation of the media content. To avoid a playback stall, the client device may stop buffering and discard the partially-buffered segment while requesting and starting buffering, at a second segment bitrate lower than the first segment bitrate, an alternative segment representing the same or similar portion of the media content item, but which is lower in video quality (e.g., containing less audio-visual details and thus less audio-visual data), than the content of the entire segment that failed to be entirely buffered in time. Due to the lower video quality (and, correspondingly, smaller file size), the client device may be able to buffer, at the second segment bitrate, the entire alternative segment of smaller file size prior to the time point at which the presentation of the alternative segment is due to start.

Because two segments of different file sizes and qualities have been downloaded and at least partially buffered for the same portion of content, this situation results in bandwidth wastage. Further, if the drop in video quality from the previously presented segment to the new alternative segment is significant, this jarring drop in quality may annoy the user and result in a lower QoE for the user.

In some approaches, the aforementioned issues are mitigated by increasing the size of the player buffer or the number of segments to be buffered in the player buffer before the presentation of the buffered segments starts. This allows for increasing the time period between the end of the buffering of a segment in a player buffer and the presentation of the segment: the higher this period of time, the more time a client device has for the bandwidth to reach the value allowing the buffering of the segment at a requested segment bitrate. Besides increasing the size of the player buffer or its fill factor, it also unfortunately increases the delay or the start-up time in the presentation of a requested media content item. There is accordingly a need for alternative methods and systems able to reduce bandwidth wastage and segment replacement during ABR streaming.

Methods and systems, e.g., implemented by a client device, are provided herein for requesting a segment of a media content item requested for presentation using ABR streaming so as to improve the latter. Advantageously, one or more disclosed techniques may be implemented to minimize segment replacement, thereby reducing wasted downloads of multiple different segments for the same or similar portion of the media content item. Because these wasteful downloads of redundant segments are reduced or eliminated, bandwidth is freed up when compared to approaches that suffer from significant segment replacement. Due to this more efficient use of network resources, the disclosed techniques enable the download and presentation of higher quality segments when compared to alternative approaches, even when a drop-down in quality and file size is needed. As a result, transitions between different levels of the ABR ladder may be more subtle and less jarring to the user, resulting in a better QoE for the user. One or more disclosed techniques may be characterized as preemptively "dropping down" the ABR ladder at optimal times to avoid segment replacement. These optimal times may be, for example, when a portion of a media content item has relatively little motion or movement. In such portions, dropping down the ladder may have little impact in quality as perceived by the user. In any event, in example implementation, a first segment bitrate is determined based on an available bandwidth. It is determined that a second segment bitrate is available, the second segment bitrate being lower than the first segment bitrate. It is determined that a video quality of the segment of the media content item requested at the second segment bitrate is within a video quality variation range. Based on the determining that the video quality of the segment of the media content item requested at the second segment bitrate is within the video quality variation range, the segment of the media content item at the second segment bitrate is requested.

In some examples, the client device searches for the presence of a plurality of alternative segments representative of a same or similar portion (e.g., segment) of a media content item, wherein each alternative segment of the plurality of alternative segments can be requested at a respective segment bitrate, indicative of an amount of audio-visual data. A respective segment bitrate is thus associated with each alternative segment of the plurality of alternative segments. The higher the segment bitrate, the higher the amount of audio-visual data. In some examples, the higher the amount of audio-visual data, the higher the video quality will be. For example, a compression codec may differently decrease the amounts of audio-visual data of two alternative segments, which implies that the difference in segment bitrates, obtained after compression, of the alternative segments is dependent upon the initial amount of audio-visual data and the compression codec utilized. The client device thus preferentially requests a segment at a lower segment bitrate when said segment is available and the video quality of said segment is to be within a threshold (e.g., video quality variation threshold). This allows for decreasing the amount of audio-visual data forwarded, via the communication network, from the server to the client device, while maintaining the QoE for the user. In some instances, a communication network provider sets at least one client device, belonging to a communication network of the communication network provider, to implement the aforementioned methods and systems for requesting a segment of a media content item requested for presentation in order to decrease the bandwidth consumed per client device. In some instances, a media service provider sets at least one client device accessing a media application relating to the media service provider that provides the media content item requested for presentation, to implement the aforementioned methods and systems for requesting a segment of a media content item requested for presentation in order to decrease the bandwidth consumed per client device.

Generally, for a user consuming a media content item, the video quality (e.g., objective, perceived or estimated video quality) of the media content item should seem consistent from one segment to another segment. In other words, the QoE for the user may rely on the consistency, from the user's point of view, of the video quality over a plurality of consecutive segments. This allows for the video quality from one segment to another segment to vary by a level, e.g., by a measurable level within a range, generally not perceivable to the user. When the video quality (e.g., objective, perceived or estimated video quality) of the segment of the media content item requested at the second segment bitrate (lower than the first bitrate) is within a video quality variation range, the user is unable to detect a change in video quality when consuming the segment of the media content item requested at the second segment bitrate: the QoE for the user is unaltered. When the video quality of the segment of the media content item requested at the second segment bitrate (lower than the first bitrate) is outside a video quality variation range, the user is able to detect a change in video quality when consuming the segment of the media content item requested at the second segment bitrate: the QoE for the user is lowered. The objective video quality of a segment is based, e.g., solely based, on the plurality of characteristics of the segment indicative of a video quality, such as image resolution (width*height in pixels), frame rate, image bit depth (color), audio sample rate, sound bit depth (number of bits in each sample), etc. The higher the magnitude of a value associated with a characteristic of the plurality of characteristics of the segment indicative of a video quality, the higher the video quality of the segment. The perceived video quality of a segment is based on a plurality of characteristics of the segment (each characteristic of the plurality of characteristics of the segment being indicative of a video quality such as image resolution (width*height in pixels), frame rate, image bit depth (color), audio sample rate, sound bit depth (number of bits in each sample), etc.) and a plurality of characteristics of a user (each characteristic of the plurality of characteristics of the user being related to the user's perception of a respective characteristic of the plurality of characteristics of the segment indicative of a video quality), the user being e.g., a single user or a machine learning model trained to act as a single user. Irrespective of the nature of the video quality selected (e.g., objective, perceived or estimated video quality), the video quality should be consistent across consecutive segments so as to maintain the QoE for the user.

In some approaches, the client device determines an objective video quality of a segment based exclusively on a plurality of characteristics of a segment, each characteristic of the plurality of characteristics of the segment being indicative of a video quality and an algorithm into which each value associated with a characteristic of the plurality of characteristics of the segment are fed, wherein said algorithm does not take into account the user's perception of the video quality of the segment. The client device retrieves, from a manifest relating to the media content item requested for presentation, a plurality of characteristics of a segment, indicative of a video quality, such as image resolution (width*height in pixels), frame rate, image bit depth (color), audio sample rate, sound bit depth (number of bits in each sample), etc. The client device then feeds each value associated with a characteristic of the plurality of video quality-related characteristics of the segment into an algorithm to determine the objective video quality of the segment. In some instances, an objective video quality, a characteristic '$x_i$' of the plurality of characteristics of a segment and a weight '$a_i$' assigned to the characteristic '$x_i$' are linked by the following mathematical relationship:

$$\text{objective video quality} = \sum_{i=1}^{j}(a_i * x_i)$$

wherein the weight '$a_i$' belongs to the set of non-negative real numbers including zero. In some instances, a user's ability to perceive a difference between two objective video qualities may be determined, e.g., as a calibration step. For example, the client device prompts the user to compare, multiple times, the objective video qualities of two similar images of different objective video qualities. During a first image test round, the client device prompts the user to compare a first image of a first objective video quality and a second image of a second objective video quality, wherein first and second images are similar. If the user is unable to distinguish a difference between the first video quality and the second video quality, the client device prompts the user to compare the first image with a third image of a third objective video quality, wherein first image and third image are similar and the third objective video quality of the third image is further apart from both the first objective video quality and second objective video quality. If the user is unable to distinguish a difference between first objective video quality and the third objective video quality, the client device prompts the user to compare the first image with a fourth image of a fourth objective video quality, wherein first image and fourth image are similar and the fourth objective video quality of the fourth image is further apart from the first objective video quality, second objective video quality and third objective video quality. If the user is able to distinguish a difference between the first objective video quality and the fourth objective video quality, the client device determines a range between the first objective video quality and the third video quality, in which the user is unable to determine a difference between objective video qualities. By subjecting the user to multiple image test rounds, the client device identifies, on the objective video quality axis, a sequence of consecutive or discrete objective video quality ranges, wherein in each objective video quality range, the objective video quality perceived by the user is deemed to be the same. In some instances, the client device trains a machine learning model using the method above. In some approaches, the client device may also subject the user to similar audio test rounds so as to identify, on the objective video quality axis, a sequence of consecutive or discrete objective video quality ranges, wherein in each objective video quality range, the objective video quality perceived by the user is deemed to be the same.

In some approaches, the client device determines a perceived video quality of a segment based on both a plurality of characteristics of a segment, each characteristic of the plurality of characteristics of the segment being indicative of a video quality, and a plurality of characteristics of a user, each characteristic of the plurality of characteristics of the user being related to the user's perception of a respective characteristic of the plurality of characteristics of the segment indicative of a video quality). In some instances, the client device determines a perceived video quality of a segment based on both a plurality of characteristics of a segment, each characteristic of the plurality of characteristics of the segment being indicative of a video quality, and a plurality of weights, e.g., obtained from a user profile of the user. The client device retrieves, from a manifest of the media content item requested for presentation, a plurality of characteristics of a segment, indicative of a video quality, such as image resolution (width*height in pixels), frame rate, image bit depth (color), audio sample rate, sound bit depth (number of bits in each sample), etc. The client device then assigns a respective weight, e.g., retrieved from a user profile, to each value associated with a characteristic of the plurality of video quality-related characteristics. The client device subsequently multiplies, for each characteristic, the value associated with the characteristic by the respective weight to generate a resulting value. The client device sums up each resulting value to determine a perceived video quality of the segment. In some instances, a perceived video quality, a characteristic 'x$_i$' of the plurality of characteristics of a segment and a weight 'b$_i$' assigned to the characteristic 'x$_i$' are linked by the following relationship:

$$\text{perceived video quality} = \sum_{i=1}^{j}(b_i * x_i)$$

Wherein the weight 'b$_i$' belongs to the set of real numbers, represents a characteristic of a plurality of characteristics of a user, that relates to a user's perception of the characteristic 'x$_i$', and is retrieved by the client device from a user profile of the user. In some instances, the client device determines the weight 'b$_i$' based on the sequence of consecutive objective video quality ranges on the objective video quality axis, following the method described in [0010]. In some instances, the client device subjects the user to a method similar to the method described in [0010] using perceived video qualities so as to determine a sequence of consecutive or discrete perceived video quality ranges on a perceived video quality axis, wherein in each perceived video quality range, the perceived video quality perceived by the user is deemed to be the same. In some instances, the client device trains a machine learning model using said similar method.

In some examples, the client device retrieves at least one past bandwidth during the ABR streaming. In some examples, additionally, the client device determines the available bandwidth based on the at least one past bandwidth.

In some examples, during the ABR streaming, the client device predicts an available bandwidth when the to-be-requested segment will be requested based on at least one past bandwidths associated with previously-requested segments. This allows for selecting alternative segments representative of the same or similar portion (e.g., segment) of a media content item, whose respective segment bitrates are below the predicted available bandwidth. The client device then checks that the video quality (e.g., objective, perceived or estimated quality) of these alternative segments is to be within the video quality variation range. The client device subsequently selects one of these alternative segments whose video quality is within the video quality variation range. Preferentially, the client device subsequently selects the alternative segment whose video quality is the lowest video quality of these alternative segments, located within the video quality variation range so as to decrease the amount of compressed audio-visual data (to be forwarded from the server to the client device), the time to buffer the alternative segment and the probability to undergo a segment replacement, while maintaining the QoE for the user. In some examples, the client device operates in a saving mode (to save communication network resources) wherein the client device requests, at all times, the alternative segment associated with the second segment bitrate that is the lowest second segment bitrate, the second segment bitrate being lower than the first segment bitrate and the video quality of the alternative segment associated with the lowest second segment bitrate being within the video quality variation range. In some examples, upon a user input, the client device switches on or off the saving mode. In some examples, a communication network provider or media service provider switches on or off the saving mode of a client device.

In some examples, the client device requests the segment of the media content item at the first segment bitrate. For instance, in some examples, the client device determines that a second segment bitrate is not available (and, as a result, requests the segment of the first segment bitrate). In some examples, alternatively, the client device determines that the video quality of the segment of the media content item requested at the second segment bitrate is not within the video quality variation range. As a result, the client device may request the segment of the media content item at the first segment bitrate.

In some examples, the client device, by default, requests the segment of the media content item at the first segment bitrate when a second segment bitrate is not available or when the video quality of the segment of the media content item requested at the second segment bitrate is not within the video quality variation range.

In some approaches, the client device implements any suitable method of representing a plurality of past bandwidths into an available bandwidth. In some instances, a suitable method of representing a plurality of past bandwidths into an available bandwidth comprises a method to determine a weighted average of a plurality of past bandwidths, wherein weights are assigned based on the recency, relative to the time point associated with the determination of the weighted average of the plurality of past bandwidths, of each past bandwidth of the plurality of past bandwidths. In some examples, the client device determines the available bandwidth based on at least one past bandwidth.

In some examples, the client device determines the first segment bitrate at the available bandwidth by at least accessing a manifest comprising information about a plurality of segments of the media content item. In some examples, the client device determines the first segment bitrate at the available bandwidth by at least retrieving, from the manifest, at least one available segment bitrate related to the segment of the media content item. In some examples, the client device determines the first segment bitrate at the available bandwidth by at least determining, among the at least one available segment bitrate, a highest available segment bitrate that does not exceed the available bandwidth. In some examples, the client device determines the first segment bitrate at the available bandwidth by at least setting the highest available segment bitrate as the first segment bitrate.

In such examples, the client device sets, as the first segment bitrate, the highest available segment bitrate associated with an alternative segment of the plurality of alternative segments representative of a same or similar portion (e.g., segment) of a media content item, that does not exceed the available bandwidth. The client device, therefore, defines the highest segment bitrate allowed by the available bandwidth the client device is to preferentially avoid using.

In some examples, the client device determines that the second bitrate is available by at least accessing a manifest comprising information about a plurality of segments of the media content item. In some examples, in addition, the client device determines that the second bitrate is available by at least retrieving, from the manifest, multiple available segment bitrates related to the segment. In some examples, furthermore, the client device determines that the second bitrate is available by at least determining, among the multiple available segment bitrates, a first available segment bitrate that does not exceed the available bandwidth. In some examples, additionally, the client device determines that the second bitrate is available by at least determining, among the at least multiple segment bitrates, a second available segment bitrate that does not exceed the available bandwidth, wherein the second available segment bitrate is lower than the first available segment bitrate. In some examples, moreover, the client device determines that the second bitrate is available by at least setting the second available segment bitrate as the second segment bitrate.

In such examples, the client device thus sets, as the second segment bitrate, a lower available segment bitrate associated with an alternative segment of the plurality of alternative segments representative of a same or similar portion (e.g., segment) of the media content item, among multiple segment bitrates that do not exceed the available bandwidth, the second segment bitrate being lower than the first segment bitrate. The client device, therefore, defines the segment bitrate (lower than the highest segment bitrate allowed by the available bandwidth) the client device is to preferentially use if the video quality of the segment to be requested at said segment bitrate were to be within a video quality variation range. In some approaches, the first segment bitrate is the highest available segment bitrate that does not exceed the available bandwidth while the second available bitrate is the closest available segment bitrate to the first segment bitrate, that does not exceed the available bandwidth (the video quality of the alternative segment requested at the second segment bitrate being withing the video quality variation range). In some approaches, the first segment bitrate is the highest available segment bitrate that does not exceed the available bandwidth while the second available bitrate is the lowest available segment bitrate to the first segment bitrate, that does not exceed the available bandwidth (the video quality of the alternative segment requested at the second segment bitrate being withing the video quality variation range).

In some examples, the client device retrieves, from a manifest comprising information about a plurality of segments of the media content item, a video quality (e.g., objective, perceived or estimated video quality) of at least one segment previously requested. In some examples, additionally, the client device determines the video quality variation range based on the video quality (e.g., objective, perceived or estimated video quality) of the at least one segment previously requested.

In such examples, the client device maintains the QoE for a user by defining, based on at least one segment previously requested, the video quality variation range within which the user cannot perceive a variation in the video quality (e.g., objective, perceived or estimated video quality). In some approaches, the client devices sets a mathematical relationship between the video quality variation range 'R', the video quality (e.g., objective, perceived or estimated video quality) '$Q_{PR}$' of a previously-requested segment and a video quality variation 'Δ':

$$R = (Q_{PR} - \Delta, Q_{PR} + \Delta) \tag{1}$$

The video quality variation range 'R' encompasses any video quality comprised between $Q_{PR}-\Delta$ and $Q_{PR}+\Delta$, as well as the boundaries $Q_{PR}-\Delta$ and $Q_{PR}+\Delta$. The client device sets the video quality variation 'Δ' to a value corresponding to a percentage of the video quality (e.g., objective, perceived or estimated video quality) '$Q_{PR}$' of the previously-requested segment e.g., that has been played. In some instances, the client device determines the objective video quality '$Q_{PR}$' of the previously-requested segment based exclusively on a plurality of characteristics of the previously-requested segment, indicative of a video quality, and an algorithm into which each value associated with a characteristic of the plurality of characteristics of the previously-requested segment are fed, wherein said algorithm does not take into account the user's perception of the video quality. In some instances, the previously-requested segment is the segment requested before the to-be-requested segment and to be presented right before the to-be-requested segment. In some instances, the client device determines a perceived video quality of a previously-requested segment based on both a plurality of characteristics of the previously-requested segment, each characteristic indicative of a video quality, and a plurality of characteristics of a user, each characteristic of the plurality of characteristics of the user being related to the user's perception of a respective characteristic of the plurality of characteristics of the segment indicative of a video quality.

In some examples, the video quality variation range 'R' is defined according to the following mathematical relationship:

$$R = (Q_{PR} - \Delta_1, Q_{PR} + \Delta_2) \tag{1A}$$

wherein '$Q_{PR}$' is the video quality (e.g., objective, perceived or estimated video quality) of a previously-requested segment, and the value of the video quality variation '$\Delta_1$' and the value of the video quality variation '$\Delta_2$' are different.

In some examples, the video quality range 'R' in mathematical relationships (1) and (1A) corresponds to an objective video quality range obtained following the image test-based method described in [0010] or a sub-range of an objective video quality range obtained following the image test-based method described in [0010]. In some examples, the client device determines in which objective video quality range the objective video quality '$Q_{PR}$' is located and then determines the video quality variation '$\Delta$', or video quality variations '$\Delta_1$' and '$\Delta_2$'.

In some examples, the video quality range 'R' in mathematical relationships (1) and (1A) corresponds to a perceived video quality range obtained following the image test-based method described in [0011] or a sub-range of a perceived video quality range obtained following the image test-based method described in [0011]. In some examples, the client device determines in which perceived video quality range the objective video quality '$Q_{PR}$' is located and then determines the video quality variation '$\Delta$', or video quality variations '$\Delta_1$' and '$\Delta_2$'.

In some approaches, the client device uses a mathematical relationship (2) between the video quality variation range 'R', the weighted video quality average, '$Q_{WA}$', of previously-requested segments (based on e.g., objective, perceived or estimated video qualities of previously-requested segments) and a video quality variation '$\Delta$':

$$R = (Q_{WA} - \Delta, Q_{WA} + \Delta) \tag{2}$$

The video quality variation range 'R' encompasses any video quality comprised between $Q_{WA}-\Delta$ and $Q_{WA}+\Delta$, as well as the boundaries $Q_{WA}-\Delta$ and $Q_{WA}+\Delta$. The client device sets the video quality variation '$\Delta$' to a value corresponding to a percentage of the weighted video quality average, '$Q_{WA}$', of previously-requested segments e.g., that have been played (based on e.g., objective, perceived or estimated video qualities of previously-requested segments e.g., that have been played). In some instances, the client device determines the objective video quality of each previously-requested segment of the plurality of previously-requested segments based exclusively on the plurality of characteristics of each previously-requested segment (each characteristic of the plurality of characteristics of each previously requested segment being indicative of a video quality) and an algorithm into which each value associated with a characteristic of the plurality of characteristics of each previously-requested segment are fed, wherein said algorithm does not take into account the user's perception of the video quality. To determine the weighted video quality average (based on objective video qualities), the client device assigns a respective weight to the objective video quality of each previously-requested segment, wherein the respective weight is based on the recency of the segment request associated with a previously-requested segment relative to the time point associated with the determination of the weighted video quality average, '$Q_{WA}$': the higher the recency of a segment request, the higher the weight of a previously-requested segment. The client device multiplies each objective video quality of a previously-requested segment by a respective weight to generate a value associated with a previously-requested segment and sums up each value associated with a previously-requested segment so as to determine the weighted video quality average, '$Q_{WA}$', of previously-requested segments (based on objective video qualities). In some instances, the plurality of previously-requested segments are consecutive segments requested before the to-be-requested segment and to be presented right before the to-be-requested segment.

In some examples, the video quality variation range 'R' is defined according to the following mathematical relationship:

$$R = (Q_{WA} - \Delta_1, Q_{WA} + \Delta_2) \tag{2A}$$

wherein '$Q_{WA}$' is the video quality (e.g., objective, perceived or estimated video quality) of previously-requested segments (based on e.g., objective, perceived or estimated video qualities of previously-requested segments), the value of the video quality variation '$\Delta_1$' and the value of the video quality variation '$\Delta_2$' are different.

In some examples, the video quality range 'R' in mathematical relationships (2) and (2A) corresponds to an objective video quality range obtained following the image test-based method described in [0010] or a sub-range of an objective video quality range obtained following the image test-based method described in [0010]. In some examples, the client device determines in which objective video quality range the objective video quality '$Q_{PR}$' is located and then determines the video quality variation '$\Delta$', or video quality variations '$\Delta_1$' and '$\Delta_2$'.

In some examples, the video quality range 'R' in mathematical relationships (2) and (2A) corresponds to a perceived video quality range obtained following the image test-based method described in [0011] or a sub-range of a perceived video quality range obtained following the image test-based method described in [0011]. In some examples, the client device determines in which perceived video quality range the objective video quality '$Q_{PR}$' is located and then determines the video quality variation '$\Delta$', or video quality variations '$\Delta_1$' and '$\Delta_2$'.

In some instances, the client device determines the perceived video quality of each previously-requested segment of the plurality of previously-requested segments based on both a plurality of characteristics of the previously-requested segment, each characteristic indicative of a video quality, and a plurality of characteristics of a user, each characteristic of the plurality of characteristics of the user being related to the user's perception of a respective characteristic of the plurality of characteristics of the segment indicative of a video quality. To determine the weighted video quality average (based on perceived video qualities), the client device assigns a respective weight to the perceived video quality of each previously-requested segment, wherein the respective weight is based on the recency of the segment request associated with a previously-requested segment relative to the time point associated with the determination of the weighted video quality average, '$Q_{WA}$': the higher the recency of a segment request, the higher the weight of a previously-requested segment. The client device multiplies each perceived video quality of a previously-requested segment by a respective weight to generate a value associated with a previously-requested segment and sums up each value associated with a previously-requested segment so as to determine the weighted video quality average, '$Q_{WA}$', of previously-requested segments (based on perceived video qualities). In some instances, the plurality of previously-requested segments are consecutive segments requested before the to-be-requested segment and to be presented right before the to-be-requested segment.

In some examples, the client device determines a type of the segment of the media content item. In some examples, additionally, the client device determines the video quality variation range based on the type of the segment of the media content item.

Hereby, the client device uses the segment type to tune the video quality variation range 'R' of mathematical relationships (1) and (2) by e.g., selecting the value of the video quality variation '$\Delta$' based on the segment type. The client device uses the segment type to tune the video quality variation range 'R' of mathematical relationships (1A) and (2A) by e.g., selecting the values of the video quality variations '$\Delta_1$' and '$\Delta_2$' based on the segment type.

In some approaches, the client device retrieves information, e.g., from a manifest relating to the media content item requested for presentation, about the type of the segment. That information comprises metadata indicating the dominant presence of audio-visual elements allowing the categorization of the segment into a segment type (e.g., action sequence, static shot, detailed scene, simple scene, main content requested by a user or supplemental content imposed to the user). In some approaches, alternatively, the client device analyzes, using a machine learning model having image recognition capabilities, a segment to determine the dominant presence of audio-visual elements and categorize the segment into a segment type (e.g., action sequence, static shot, detailed scene, simple scene, main content e.g., requested by a user or supplemental content e.g., imposed to the user). Instructions stored on a non-transitory computer-readable medium comprise instructions that when executed by control circuitry of the client device cause the control circuitry of the client device to control a machine learning model able to analyze the content (e.g., identify audio-visual elements) of a segment and categorize a segment into a segment type.

In some examples, the client device assigns a first estimated video quality to a segment previously consumed. In some examples, additionally, the client device assigns a second estimated video quality to the segment previously consumed. In some examples, furthermore, the client device determines the video quality variation range based on the difference between the first estimated video quality and the second estimated video quality.

In such examples, the client device assigns estimated video qualities to a segment previously consumed by multiple users, using a machine learning model. Instructions stored on a non-transitory computer-readable medium comprise instructions that when executed by control circuitry of the client device cause the control circuitry of the client device to control a machine learning model able to analyze the content of a segment (e.g., extract audio-visual characteristics of the short video such as image resolution, frame rate, image bit depth (color), audio sample rate, sound bit depth (number of bits in each sample), etc.) and determine an estimated video quality of the segment based on a user's previous interactions (e.g., providing a grade on a satisfaction feedback scale) with short videos belonging to a training set. In such examples, the machine learning model is able to predict a video quality variation range when a user streams a media content item they requested, the client device having no available data about the user to determine a perceived video quality of a segment.

To do so, the machine learning model prompts a user to consume a short video of the training set, then requests the user's feedback about the video quality of the short video using a satisfaction feedback scale (e.g., 5-star feedback scale or 1-to-10 feedback scale) to express their degree of satisfaction in terms of video quality when consuming the short video. Each value associated with the user's satisfaction feedback is between a minimum value and a maximum value, wherein the minimum value corresponds to a minimum grade that the user would associate with a short video if the video quality, perceived by the user, of said short video was providing a minimum satisfaction to the user; and wherein the maximum value corresponds to a maximum grade that the user would associate with a short video if the video quality, perceived by the user, of said short video was providing a maximum satisfaction to the user. Each value associated with the user's satisfaction feedback corresponds to a respective value associated with the objective video quality of short videos. The minimum grade and maximum grade depend upon the satisfaction feedback scale selected by the user. The machine learning model subsequently receives, upon user input, satisfaction feedback data about the short video and correlates the satisfaction feedback data with the objective video quality of the short video, determined by feeding, to an algorithm, a value for each audio-visual characteristic of a plurality of audio-visual characteristics, indicative of a video quality, of the short video such as image resolution, frame rate, image bit depth (color), audio sample rate, sound bit depth (number of bits in each sample), etc. For each short video of the training set, the machine learning model subjects the user to the same sequence of operations. Gradually, the machine learning model improves the user-dependent correlation between satisfaction feedback data and objective video quality determined using an algorithm fed with audio-visual characteristics of a segment indicative of a video quality. The machine learning model plots, on a graph representing the user's satisfaction feedback against the objective video quality of short videos, each dot corresponding to the tuple (value associated with the user's satisfaction feedback; objective video quality of a short video) and applies a linear regression on a plurality of dots to determine the linear relationship between the user's satisfaction feedback and the objective video quality of short videos. This linear equation is user-dependent. The machine learning model trained by a user uses an algorithm to assign, based on the linear relationship between the user's feedback satisfaction and the objective video quality of short videos, an estimated video quality to a segment to be consumed by a user. The machine learning model trained by a first user thus assigns a first estimated video quality '$Q_{evq1}$' to a segment that is to be requested to be consumed. Similarly, the machine learning model trained by a second user assigns a second estimated video quality '$Q_{evq2}$' to the same segment that is to be requested to be consumed. The machine learning model sets the average of first estimated video quality '$Q_{evq1}$' and second estimated video quality '$Q_{evq2}$' as the estimated video quality of the segment to be consumed by a user for which the client device does not have any data. In some examples, the machine learning model assigns multiple estimated video qualities to a same segment, each based on a respective user on which the machine learning model trained, and sets the average of the multiple estimated video qualities as the estimated video quality assigned to the same segment.

The machine learning model finally uses mathematical relationship (1) or (1A) wherein the video quality '$Q_{PR}$' of the previously-requested segment e.g., that has been played is the estimated video quality of the previously-requested segment e.g., that has been played, which is the average of first estimated video quality '$Q_{evq1}$' and second estimated video quality '$Q_{evq2}$'. The video quality variation '$\Delta$' corresponds to a percentage of the video quality '$Q_{PR}$' of the previously-requested segment e.g., that has been played. The video quality variations '$\Delta_1$' and '$\Delta_2$' correspond each to a percentage of the video quality '$Q_{PR}$' of the previously-requested segment e.g., that has been played. In some instances, the video quality variation '$\Delta$' corresponds to half the difference between estimated video quality '$Q_{evq1}$' and second estimated video quality '$Q_{evq2}$'. In some instances, the video quality variations '$\Delta_1$' and '$\Delta_2$' correspond each to a percentage of half the difference between estimated video quality '$Q_{evq1}$' and second estimated video quality '$Q_{evq2}$'. In some examples, if the machine learning model is trained by multiple users (more than two users), the video quality variation '$\Delta$' is based on the variance of the multiple estimated video qualities. In some examples, if the machine learning model is trained by multiple users (more than two users), the video quality variations '$\Delta_1$' and '$\Delta_2$' are each based on the variance of the multiple estimated video qualities.

Alternatively, the machine learning model finally uses mathematical relationship (2) or (2A) wherein the video quality '$Q_{WA}$' of previously-requested segments e.g., that have been played is the weighted estimated video quality average of the previously-requested segments e.g., that have been played. The video quality variation '$\Delta$' corresponds to a percentage of the video quality '$Q_{WA}$' of the previously-requested segments e.g., that have been played. The video quality variations '$\Delta_1$' and '$\Delta_2$' correspond each to a percentage of the video quality '$Q_{WA}$' of the previously-requested segments e.g., that have been played. In some instances, the video quality variation '$\Delta$' is based on the difference, for each estimated video quality of the previously-requested segments e.g., that have been played, between estimated video quality '$Q_{evq1}$' and second estimated video quality '$Q_{evq2}$'. In some instances, the video quality variations '$\Delta_1$' and '$\Delta_2$' are each based on the difference, for each estimated video quality of the previously-requested segments e.g., that have been played, between estimated video quality '$Q_{evq1}$' and second estimated video quality '$Q_{evq2}$'.

The training set comprises multiple short videos of different genres (e.g., action, comedy, drama, fantasy, horror, mystery, romance, thriller, western, sport, documentary, etc.). In some instances, the machine learning model may alter at least one audio-visual characteristic of a short video to generate multiple short videos so as to expand the training set.

In some examples, the client device buffers, based on the requesting the segment of the media content item at the second segment bitrate, the segment requested at the second segment bitrate. In some examples, additionally, the client device determines that the buffering of the segment requested at the second segment bitrate is to be completed prior to a time point at which a presentation of the segment is due to start. In some examples, furthermore, the client device continues, based on the determining that the buffering of the segment at the second segment bitrate is to be completed prior to the time point at which the presentation of the segment is due to start, buffering the segment requested at the second segment bitrate. In some examples, alternatively, the client device determines that the buffering of the segment requested at the second segment bitrate is not to be completed prior to the time point at which the presentation of the segment is due to start. In some examples, in addition, the client device buffers, based on the determining that the buffering of the segment at the second segment bitrate is not to be completed prior to the time point at which a presentation of the segment is due to start, the segment requested at a third segment bitrate, the third segment bitrate being lower than the second segment bitrate.

In some examples, during the buffering of a segment requested at a segment bitrate determined prior to the segment request, the client device checks, as the current bandwidth may vary during the buffering of the segment, whether the buffering of the segment is to occur in time (before the segment is due to be presented). If so, the client continues buffering the segment. If not, to avoid a presentation stall, the client device stops buffering and discards the segment initially requested, then requests and buffers an alternative segment whose segment bitrate is lower than that of the initially-requested segment in order to achieve a faster buffering and increase the probability to have the buffering of the requested segment completed before the requested segment is due to be presented. This results in a segment replacement because of the variability of the available bandwidth over time.

In some examples, the client device buffers, based on the requesting the segment of the media content item at the second segment bitrate, the segment requested at the second segment bitrate. In some examples, additionally, the client device determines that a buffering of the segment requested at the second segment bitrate is not to be completed prior to a time point at which a presentation of the requested segment is due to start. In some examples, furthermore, the client device pauses, based on the determining that the buffering of the segment at the second segment bitrate is not to be completed prior to the time point at which the presentation of the requested segment is due to start, at least one application consuming a portion of a current bandwidth, the at least one application being not associated with the buffering of the segment requested at the second segment bitrate.

In some examples, as an additional safety measure to offset the bandwidth variability over time (and to avoid segment replacement), the client device frees up some bandwidth when the client device predicts that the buffering of the segment requested at the second segment bitrate is to be completed after the time point at which the requested segment is due to be presented. The client device then allocates the freed bandwidth to the streaming of the media content item requested for presentation so as to complete the buffering of the requested segment prior to the time point at which the presentation of the requested segment is due to start. This additional safety measure is to be used at the user's discretion as pausing other applications may certainly not be desired by the user.

In some examples, the client device buffers, based on the requesting the segment of the media content item at the second segment bitrate, the segment requested at the second segment bitrate. In some examples, additionally, the client device determines that a buffering of the segment requested at the second segment bitrate is not to be completed prior to a time point at which a presentation of the requested segment is due to start. In some examples, furthermore, the client device reduces, based on the determining that the buffering of the segment at the second segment bitrate is not to be completed prior to the time point at which the presentation of the requested segment is due to start, a velocity of presentation of at least one segment that is to be presented prior to the segment requested at the second segment bitrate.

In some examples, as an additional safety measure to offset the bandwidth variability over time (and to avoid segment replacement), the client device reduces the velocity of presentation of the media content item requested for presentation so as to delay the time point at which the presentation of the requested segment is due to start and increase the probability that the buffering of the segment at the second segment bitrate is to be completed prior to the time point at which the presentation of the requested segment is due to start. In some instances, the reduced velocity of presentation of the media content item requested for presentation is not perceptible to the user. This additional safety measure is to be used at the user's discretion as reducing the velocity of presentation may certainly not be desired by the user.

BRIEF DESCRIPTION OF THE DRAWINGS

FIG. 1B represents the steps of an example for improving bitrate selection in ABR streaming, in accordance with some implementations of the disclosure;

FIG. 5 represents a flowchart describing an example for improving bitrate selection in ABR streaming, in accordance with some implementations of the disclosure;

DETAILED DESCRIPTION

Figure 1A:
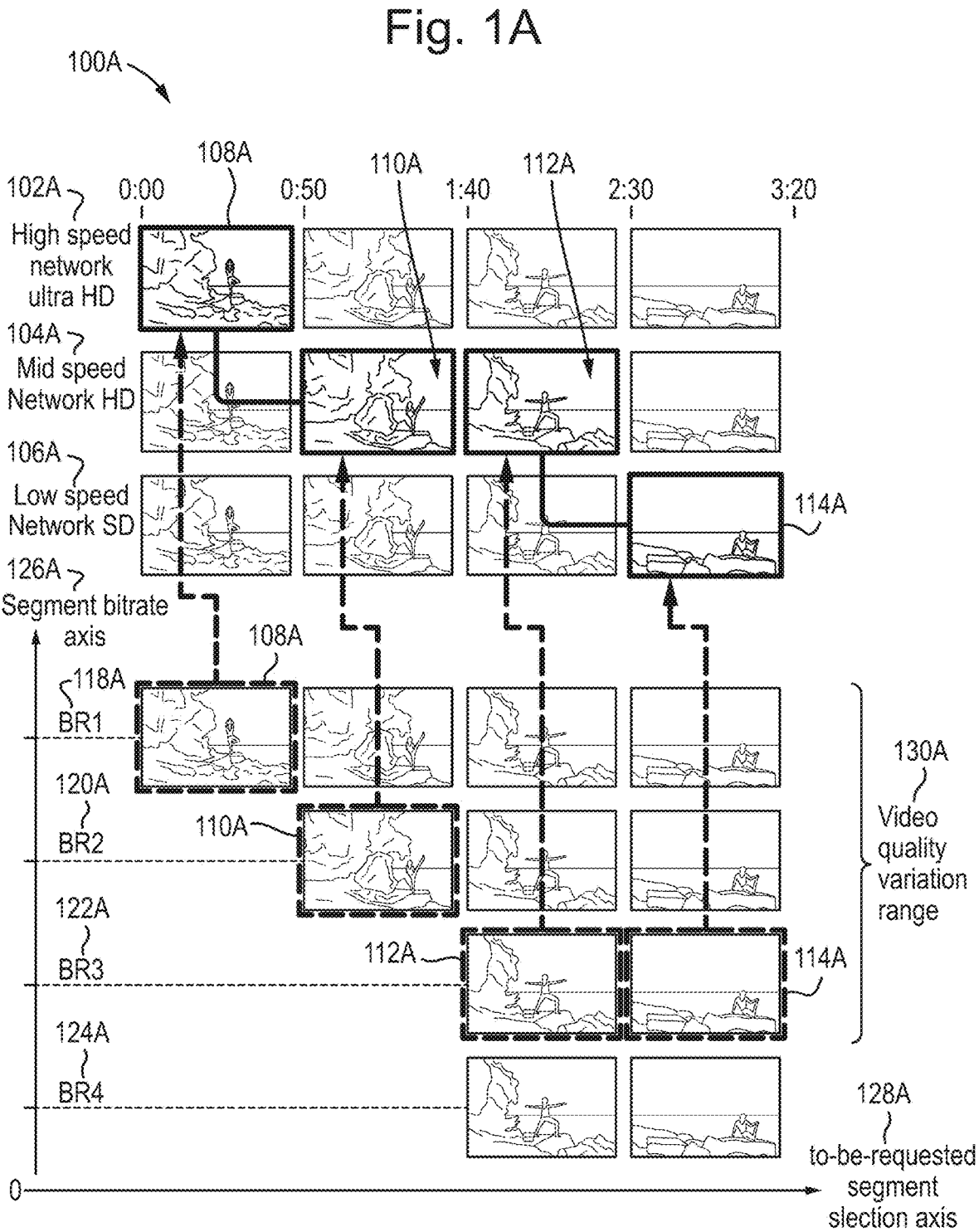
FIG. 1A shows an example for improving bitrate selection in ABR streaming, in accordance with some implementations of the disclosure.

As referred to herein, the terms "media content item" and "media asset" should be understood to mean an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, advertisements, chat sessions, social media, applications, games, and/or any other media or multimedia and/or combination of the same.

As referred herein, the term "client device" should be understood to mean a user device configured to play a media content item, such as a mobile phone, a tablet, a computer, a television and the likes. The client device is connected to a server e.g., local or remote server, via a communication network e.g., LAN or WAN, provided by a communication network provider.

As referred herein, the term 'manifest' relating to a media asset should be understood to mean a database comprising information about each portion (e.g., segment) of the media asset, in other words about each alternative segment representative of a same or similar portion (e.g., segment) of the media asset, such as location or address on a server, time period, duration, characteristics indicative of a video quality (e.g., segment bitrate, image resolution—i.e., width*height in pixels—, frame rate, image bit depth—i.e., color—, audio sample rate, sound bit depth—i.e., number of sound bits in each sample—), segment type (e.g., action sequence, static shot, detailed scene, simple scene, main content e.g., requested by a user or supplemental content e.g., imposed to the user such as advertisements, commercials, portions of TV series episodes, movie previews).

As referred herein, the term 'video quality' of a segment of a media content item should be understood to mean the amount of audio-visual data contained in the segment of the media content item. In some instances, the client device determines an objective video quality of a segment based exclusively on a plurality of characteristics of a segment, each characteristic of the plurality of characteristics of the segment being indicative of a video quality and an algorithm into which each value associated with a characteristic of the plurality of characteristics of the segment are fed, wherein said algorithm does not take into account the user's perception of the video quality of the segment. The plurality of characteristics of the segment indicative of a video quality comprises e.g., segment bitrate, image resolution—i.e., width*height in pixels—, frame rate, image bit depth—i.e., color—, audio sample rate, sound bit depth—i.e., number of sound bits in each sample—. In some approaches, the client device determines a perceived video quality of a segment based on both a plurality of characteristics of a segment, each characteristic of the plurality of characteristics of the segment being indicative of a video quality, and a plurality of characteristics of a user, each characteristic of the plurality of characteristics of the user being related to the user's perception of a respective characteristic of the plurality of characteristics of the segment indicative of a video quality. In some instances, each characteristic of the plurality of characteristics of the user corresponds to a respective weight from a user profile of the user. The client device assigns each respective weight to a value associated with a characteristic of the plurality of characteristics of the segment so as to determine a weighted sum corresponding to the perceived video quality of the segment. In some approaches, the client device determines an estimated video quality of a segment of a media content item using a machine learning model.

As referred herein, in some approaches, the term 'video quality variation range' should be understood to mean the range centered on the video quality of a previously-requested segment '$Q_{PR}$' and bound on each side by a range boundary spaced by a video quality variation 'Δ' from the video quality '$Q_{PR}$' of a previously-requested segment— Refer to mathematical relationship (1)—. Alternatively, the term 'video quality variation range' should be understood to mean the range centered on the weighted video quality average '$Q_{WA}$' and bound on each side by a range boundary spaced by a video quality variation 'Δ' from the weighted video quality average '$Q_{WA}$' of previously requested segments—Refer to mathematical relationship (2)—. A client device compares an objective video quality of a segment of a media asset with an objective video quality-related video quality variation range. A client device compares a perceived video quality of a segment of a media asset with a perceived video quality-related video quality variation range. A client device compares an estimated video quality of a segment of a media asset with an estimated video quality-related video quality variation range. In some approaches, the term 'video quality variation range' should be understood to mean the range comprising the video quality of a previously-requested segment '$Q_{PR}$' and bound on one side by a first range boundary spaced by a video quality variation '$\Delta_1$' from the video quality '$Q_{PR}$' of a previously-requested segment, and bound on the other side by a second range boundary spaced by a video quality variation '$\Delta_2$' from the video quality '$Q_{PR}$' of a previously-requested segment—Refer to mathematical relationship (1A)—. Alternatively, the term 'video quality variation range' should be understood to mean the range comprising the weighted video quality average '$Q_{WA}$' and bound on one side by a first range boundary spaced by a video quality variation '$\Delta_1$' from the weighted video quality average '$Q_{WA}$' of previously requested segments, and bound on the other side by a second range boundary spaced by a video quality variation '$\Delta_2$' from the weighted video quality average '$Q_{WA}$' of previously requested segments— Refer to mathematical relationship (2A)—.

As referred herein, the term "segment type" should be understood to mean a category determined by the dominant presence of audio and/or visual elements in the segment. A segment can be of e.g., "static shot" type when the image data related to the background remains substantially the same in all frames of the segment, "action sequence" type when the image data rapidly evolve from the first frame to the last frame of the segment, "detailed scene" type when each frame of the segment contains an amount of visual data above a first threshold that marks the minimum of a high amount of visual data, "simple scene" type when each frame of the segment contains an amount of image data below a second threshold that marks the maximum of a low amount of visual data, "main content" type when the segment is a segment of the media content item requested for presentation, by a user, "supplemental content" type when the segment is not a segment of the media content item requested for presentation by a user but a segment from e.g., advertisements that can be embedded or not, commercials that can be embedded or not, portions of TV series episodes, movie previews, or "Non-Applicable" type when the segment type is undefined.

In some approaches, the client device retrieves the type of a segment from a manifest relating to a media content item. In some approaches, alternatively, the client device analyzes, using a machine learning model having image recognition capabilities, a segment to determine the dominant presence of audio-visual elements and categorize the segment into a segment type (e.g., "action sequence", "static shot", "detailed scene", "simple scene", "main content" e.g., requested by a user, "supplemental content" e.g., imposed to the user or "Non-Applicable"). The client device determines first whether the segment is of "main content" type or "supplemental content" type. If the segment is of "main content" type, the client device will categorize the segment using one of the other possible segment types.

When a segment is of "static shot" type, a user is more prone to distinguish between low video quality and high video quality since the background is substantially the same from the first frame to the last frame of the segment while only a few visual elements are evolving from the first frame to the last frame of the segment. The client device sets the video quality variation '$\Delta$' in the mathematical relationships (1) and (2) to a low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'. The client device sets each of the video quality variations '$\Delta_1$' and '$\Delta_2$' in the mathematical relationships (1A) and (2A) to a respective low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'.

When a segment is of "action sequence" type, a user is less prone to distinguish between low video quality and high video quality since the image data rapidly evolve from the first frame to the last frame of the segment. The client device sets the video quality variation '$\Delta$' in the mathematical relationships (1) and (2) to a high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'. The client device sets each of the video quality variations '$\Delta_1$' and '$\Delta_2$' in the mathematical relationships (1A) and (2A) to a respective high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'.

When a segment is of "detailed scene" type, each frame of the segment contains a high amount of visual data such that each frame can undergo a large change in the amount of visual data without compromising a user's QoE. The client device sets the video quality variation '$\Delta$' in the mathematical relationships (1) and (2) to a high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'. The client device sets each of the video quality variations '$\Delta_1$' and '$\Delta_2$' in the mathematical relationships (1A) and (2A) to a respective high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'.

When a segment is of "simple scene" type, each frame of the segment contains a low amount of visual data such that each frame can undergo a low change in the amount of visual data without compromising a user's QoE. The client device sets the video quality variation '$\Delta$' in the mathematical relationships (1) and (2) to a low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'. The client device sets each of the video quality variations '$\Delta_1$' and '$\Delta_2$' in the mathematical relationships (1A) and (2A) to a respective low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'.

When the segment is of "main content" type, there is a high probability that the user may be interested in viewing the main content as the client device requested, upon a user input, the media content item to present. The user may only tolerate a small change in the video quality. The client device sets the video quality variation '$\Delta$' in the mathematical relationships (1) and (2) to a low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'. The client device sets each of the video quality variations '$\Delta_1$' and '$\Delta_2$' in the mathematical relationships (1A) and (2A) to a respective low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'.

In some approaches, the client device categorizes, using a machine learning machine having image recognition capabilities, a segment based on the genre (e.g., action, comedy, drama, fantasy, horror, mystery, romance, thriller, western, sport, documentary, etc.) of the segment. Based on user preferences, the client device sets, for the user's most preferred genres, the video quality variation '$\Delta$' in the mathematical relationships (1) and (2) to a low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'. Based on user preferences, the client device sets, for the user's most preferred genres, each of the video quality variations '$\Delta_1$' and '$\Delta_2$' in the mathematical relationships (1A) and (2A) to a respective low value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'. Based on user preferences, the client device sets, for the user's intermediately preferred genres, the video quality variation '$\Delta$' in the mathematical relationships (1) and (2) to an intermediate value corresponding to an intermediate percentage (e.g., between 5 and 10%) of the video quality of a previously-requested segment '$Q_{PR}$' or an intermediate percentage (e.g., between 5 and 10%) of the weighted video quality average '$Q_{WA}$'. Based on user preferences, the client device sets, for the user's intermediately preferred genres, each of the video quality variations '$\Delta_1$' and '$\Delta_2$' in the mathematical relationships (1A) and (2A) to a respective intermediate value corresponding to an intermediate percentage (e.g., between 5 and 10%) of the video quality of a previously-requested segment '$Q_{PR}$' or an intermediate percentage (e.g., between 5 and 10%) of the weighted video quality average '$Q_{WA}$'. Based on user preferences, the client device sets, for the user's least preferred genres, the video quality variation '$\Delta$' in the mathematical relationships (1) and (2) to a high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'. Based on user preferences, the client device sets, for the user's least preferred genres, each of the video quality variations '$\Delta_1$' and '$\Delta_2$' in the mathematical relationships (1A) and (2A) to a respective high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'.

When the segment is of "supplemental content" type, there is a high probability that the user may not be interested in viewing the supplemental content and may tolerate a large change in the video quality especially when the supplemental content is e.g., advertisements that can be embedded or not, commercials that can be embedded or not. The client device sets the video quality variation '$\Delta$' in the mathematical relationships (1) and (2) to a high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'. The client device sets each of the video quality variations '$\Delta_1$' and '$\Delta_2$' in the mathematical relationships (1A) and (2A) to a respective high value corresponding to a high percentage (e.g., 10, 20 or 30%) of the video quality of a previously-requested segment '$Q_{PR}$' or a high percentage (e.g., 10, 20 or 30%) of the weighted video quality average '$Q_{WA}$'. However, if the supplemental content relates to the user's preferences, the client device sets the video quality variation '$\Delta$' in the mathematical relationships (1) and (2) to a high value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'. If the supplemental content relates to the user's preferences, the client device sets each of the video quality variations '$\Delta_1$' and '$\Delta_2$' in the mathematical relationships (1A) and (2A) to a respective high value corresponding to a low percentage (e.g., 1, 2 or 5%) of the video quality of a previously-requested segment '$Q_{PR}$' or a low percentage (e.g., 1, 2 or 5%) of the weighted video quality average '$Q_{WA}$'.

FIG. 1A shows an example 100A for improving bitrate selection in ABR streaming, in accordance with some implementations of the disclosure. A client device (e.g., a client device 103) is connected to a server (e.g., a server 105) than can be a local or remote server, via a communication network (not shown) e.g., LAN or WAN. The client device selects, upon a user input, a media application (e.g., executed at least in part on the client device client e.g., device 103 and/or the server e.g., server 105) from a media service provider and generates for display a user interface listing one or more media asset identifiers corresponding to respective audio-visual media assets. The client device selects, upon a user input, an audio-visual media asset to present and requests, from the server, the audio-visual media asset.

For each segment of the audio-visual media asset, the client device determines the available bandwidth at which the segment will be requested, the available alternative segments representative of the segment of the audio-visual media asset that exhibit each a segment bitrate that does not exceed the available bandwidth, and a video quality (e.g., objective, perceived or estimated video quality) of each of these alternative segments. The client device, then, compares the video quality (e.g., objective, perceived or estimated video quality) of each of these alternative segments representative of the segment with a video quality variation range. If the video quality (e.g., objective, perceived or estimated video quality) of an alternative segment is not within the video quality variation threshold, the client device ignores the alternative segment. If the video quality (e.g., objective, perceived or estimated video quality) of an alternative segment is within the video quality variation threshold, the client device may select the alternative segment. In some examples, if the video quality (e.g., objective, perceived or estimated video quality) of a plurality of alternative segments is within the video quality variation threshold, the client device selects one of the plurality of the alternative segments based on the magnitude of the segment bitrate. In some examples, the client device selects the alternative segment exhibiting the lowest segment bitrate so as to minimize the amount of data transferred from the server to the client device. In some examples, the client device selects the alternative segment exhibiting the second lowest segment bitrate. (In some examples, if there is only a single alternative segment available, the client device requests this alternative segment. In some examples, if there are only alternative segments whose segment bitrate exceeds the available bandwidth, the client device requests the alternative segment whose segment bitrate is the closest to the available bandwidth: the buffering of the alternative segment, however, will start only when the available bandwidth is equal to or greater than the segment bitrate of the requested alternative segment.)

If there is only one available alternative segment that exhibits a segment bitrate that does not exceed the available bandwidth, the client device requests the only one available alternative segment. In some examples, the only one available alternative segment exhibits a segment bitrate that is equal to the segment bitrate of a segment previously requested.

For each segment of the audio-visual media asset, there is at least one available alternative segment representative of the segment of the audio-visual media asset, whose segment bitrate is equal to one discrete value corresponding to a bar of the ABR streaming ladder. This discrete value may be BR1, BR2, BR3 or BR4 (BR1 being greater than BR2, BR2 being greater than BR3 and BR3 being greater than BR4). A highest bar 118A of the ABR streaming ladder corresponds to the value BR1. A lowest bar 124A of the ABR streaming ladder corresponds to the value BR4. Intermediate bars 120A and 122A of the ABR streaming ladder correspond to the value BR2 and BR3, respectively. Each alternative segment of a given segment of the audio-visual media asset occupies a given bar of the ABR streaming ladder, or occupies a given position on a segment bitrate axis 126A. Alternative segments selected for request are presented along a to-be-requested segment selection axis 128A.

The client device, accordingly, selects a segment 108A, an alternative segment representative of the first segment of the audio-visual media asset, to request since segment 108 A is the only alternative segment representative of the first segment, whose segment bitrate of value BR1 does not exceed the available bandwidth and whose video quality (e.g., objective, perceived or estimated video quality) is within video quality variation range 130A. The segment bitrate of segment 108A of value BR1 is the highest segment bitrate of the ABR streaming ladder.

The client device, then selects, a segment 110A, an alternative segment representative of the second segment of the audio-visual media asset, to request since segment 110A is one of the two alternative segments representative of the second segment, whose segment bitrate of value BR2 does not exceed the available bandwidth besides being the lowest available segment bitrate (compared to the other alternative segment whose segment bitrate is of value BR1) and whose video quality (e.g., objective, perceived or estimated video quality) is within video quality variation range 130A.

The client device, then selects, a segment 112A, an alternative segment representative of the third segment of the audio-visual media asset, to request since segment 112A is one of the four alternative segments representative of the third segment, whose segment bitrate of value BR3 does not exceed the available bandwidth besides being the second lowest available segment bitrate (compared to the other three alternative segments whose segment bitrates are of value BR1, BR2 and BR4, respectively) and whose video quality (e.g., objective, perceived or estimated video quality) is within the video quality variation range 130A. The alternative segment of segment bitrate of value BR4 has a video quality (e.g., objective, perceived or estimated video quality) that is not within video quality variation range 130A: the client device thus ignores the alternative segment whose segment bitrate is of value BR4.

The client device, then selects, a segment 114A, an alternative segment representative of the fourth segment of the audio-visual media asset, to request since segment 114A is one of the four alternative segments representative of the fourth segment, whose segment bitrate of value BR3 does not exceed the available bandwidth besides being the second lowest available segment bitrate (compared to the other three alternative segments whose segment bitrates are of value BR1, BR2 and BR4, respectively) and whose video quality (e.g., objective, perceived or estimated video quality) is within video quality variation range 130A. The alternative segment of segment bitrate of value BR4 has a video quality (e.g., objective, perceived or estimated video quality) that is not within the video quality variation range 130A: the client device thus ignores the alternative segment of segment bitrate of value BR4.

To determine the video quality (e.g., objective, perceived or estimated video quality) of a segment of the audio-visual media asset requested for presentation, the client device proceeds in one of the following manners. The client device retrieves, from a manifest relating to the audio-visual media asset requested for presentation, a plurality of characteristics of the segment in question, indicative of a video quality, such as image resolution (width*height in pixels), frame rate, image bit depth (color), audio sample rate, sound bit depth (number of bits in each sample), etc., then feeds each value associated with a characteristic of the plurality of video quality-related characteristics of the segment into an algorithm to determine an objective video quality of the segment in question. In some instances, the algorithm comprises the assignment of a respective weight from a user profile to each value associated with a characteristic of the plurality of characteristics indicative of a video quality and the subsequent determination of the related weighted sum corresponding to a perceived video quality of the segment in question. Additionally, the client device retrieves, from a storage unit, the video quality '$Q_{PR}$' of a previously-requested segment e.g., that has been presented or determines the weighted video quality average, '$Q_{WA}$', of previously-requested segments e.g., that have been presented from the corresponding video qualities of the previously-requested segments stored in the storage unit. If the client device determines the objective video quality of a segment of a media asset, the video quality '$Q_{PR}$' of a previously-requested segment or the weighted video quality average, '$Q_{WA}$', of previously-requested segments are to be objective video qualities. If the client device determines the perceived video quality of a segment of a media asset, the video quality '$Q_{PR}$' of a previously-requested segment or the weighted video quality average, '$Q_{WA}$', of previously-requested segments are to be perceived video qualities. Moreover, the client device sets the video quality variation range following mathematical relationship (1) and the video quality variation '$\Delta$' to a value corresponding to a percentage of the video quality '$Q_{PR}$' of the previously-requested segment e.g., that has been presented. The client device may set the video quality variation '$\Delta$' to a value based on the type of the segment. Alternatively, the client device sets the video quality variation range following mathematical relationship (2) and the video quality variation '$\Delta$' to a value corresponding to a percentage of the weighted video quality average, '$Q_{WA}$', of previously-requested segments e.g., that have been presented. The client device may set the video quality variation '$\Delta$' to a value based on the type of the segment. Finally, the client device compares the video quality (e.g., objective or perceived video quality) of the segment of the media content item with the video quality variation range (e.g., objective video quality-related or perceived video quality-related video quality variation range) to determine that the video quality of the segment of the media content item is within the video quality variation range or not.

Alternatively, the client device uses a machine learning model trained by multiple users to determine an estimated video quality of a segment of a media asset and uses mathematical relationship (1) or (2) to determine the video quality variation range. Finally, the client device compares the estimated video quality of the segment of the media content item with the video quality variation range to determine that the video quality of the segment of the media content item is within the video quality variation range or not.

FIG. 1B represents the steps of an example 100 for improving bitrate selection in ABR streaming, in accordance with some implementations of the disclosure. A client device 103 is connected to a server 105, e.g., local or remote server, via a communication network (not shown) e.g., LAN or WAN. Client device 103 selects, upon a user input, a media application (e.g., executed at least in part on client device 103 and/or server 105) from a media service provider and generates for display a user interface listing one or more media asset identifiers corresponding to respective audio-visual media assets.

At step 102, client device 103 detects, upon a user input, a request for consumption of an audio-visual media asset (e.g., Game of Thrones), wherein the user input is implemented via a user interface of client device 103 using e.g., a mouse, a remote control or a tactile screen. In some instances, at step 102, client device 103 creates, upon the request for consumption of the audio-visual media asset, a buffer (e.g., a play buffer or display buffer) to store decoded segments of the audio-visual media asset.

At step 104, client device 103 sends, via the communication network, a request for the audio-visual media asset to server 105.

At step 106, server 105 sends, via the communication network, to client device 103, a manifest 107 relating to the requested audio-visual media asset, wherein manifest 107 is a database comprising information about each alternative segment of each portion (e.g., segment) the audio-visual media asset such as location or address on a server, time period, duration, characteristics indicative of a video quality (e.g., segment bitrate, image resolution—i.e., width*height in pixels—, frame rate, image bit depth—i.e., color—, audio sample rate, sound bit depth—i.e., number of sound bits in each sample—), segment type (e.g., action sequence, static shot, detailed scene, simple scene, main content e.g., requested by a user or supplemental content e.g., imposed to the user such as advertisements, commercials, portions of TV series episodes, movie previews).

At step 108, client device 103 determines, based on an available bandwidth, a first segment bitrate at which to request a media asset segment.

At step 110, client device 103 determines whether there is a second segment bitrate available at which to request the media asset segment, the second segment bitrate being lower than the first segment bitrate. If so, client device 103 proceeds to step 118. Alternatively, client device 103 proceeds to step 112.

At step 112, client device 103 requests, via the communication network, the media asset segment at the first segment bitrate, from server 105. At step 112, additionally, client device 103 proceeds back to step 108 to determine at which segment bitrate to request the next segment of the media asset. At step 112, additionally, client device 103 proceeds to step 114.

At step 114, when client device 103 has proceeded from step 112 to step 114, server 105 sends, via the communica-tion network, the media asset segment requested at the first segment bitrate, to client device 103.

At step 116, when client device 103 has proceeded from step 112 through step 114 to step 116, client device 103 plays the media asset segment requested at the first segment bitrate.

At step 118, client device 103 determines whether the video quality (e.g., objective, perceived or estimated video quality) of the media asset segment requested at the second segment bitrate is within a video quality variation range. If so, client device 103 proceeds to step 120. Alternatively, client device 103 proceeds to step 112.

At step 118, in addition, client device 103 retrieves, from a manifest relating to the media content item requested for presentation, a plurality of characteristics of the segment in question, indicative of a video quality, such as image resolution (width*height in pixels), frame rate, image bit depth (color), audio sample rate, sound bit depth (number of bits in each sample), etc. Client device 103 then feeds each value associated with a characteristic of the plurality of video quality-related characteristics of the segment into an algorithm to determine an objective video quality of the segment in question. In some instances, the algorithm comprises the assignment of a respective weight from a user profile to each value associated with a characteristic of the plurality of characteristics indicative of a video quality and the subsequent determination of the related weighted sum corresponding to a perceived video quality of the segment in question. In some examples, at step 118, furthermore, client device 103 retrieves, from a storage unit, the video quality '$Q_{PR}$' (e.g., objective, perceived or estimated video quality) of a previously-requested segment or determines the weighted video quality average, '$Q_{WA}$', of previously-requested segments (using the objective, perceived or estimated video qualities) from the corresponding video qualities of the previously-requested segments stored in the storage unit. At step 118, additionally client device 103 sets the video quality variation range following mathematical relationship (1) and the video quality variation '$\Delta$' to a value corresponding to a percentage of the video quality '$Q_{PR}$' of the previously-requested segment. Moreover, client device 103 may set the video quality variation '$\Delta$' to a value based on the type of the segment. At step 118, alternatively, client device 103 sets the video quality variation range following mathematical relationship (2) and the video quality variation '$\Delta$' to a value corresponding to a percentage of the weighted video quality average, '$Q_{WA}$', of previously-requested segments. Moreover, client device 103 may set the video quality variation '$\Delta$' to a value based on the type of the segment. At step 118, alternatively, the client device uses a machine learning model trained by multiple users to determine an estimated video quality of a segment of a media asset and uses mathematical relationship (1) or (2) to determine the video quality variation range. At step 118, finally, client device 103 compares the video quality (e.g., the objective, perceived or estimated video quality) of the segment of the media content item requested at the second segment bitrate with the video quality variation range (related to e.g., the objective, perceived or estimated video quality) to determine that the video quality (e.g., objective, perceived or estimated video quality) of the segment of the media content item requested at the second segment bitrate is within the video quality variation range or not. If so, client device 103 proceeds to step 120. If not, client device proceeds to step 112.

At step 120, client device 103 requests, via the communication network, the media asset segment at the second segment bitrate, from server 105. At step 120, additionally, client device 103 proceeds back to step 108 to determine at which segment bitrate to request the next segment of the media asset. At step 120, additionally, client device 103 proceeds to step 114.

At step 114, when client device 103 has proceeded from step 120 to step 114, server 105 sends, via the communication network, the media asset segment requested at the second segment bitrate, to client device 103.

At step 116, when client device 103 has proceeded from step 120 through step 114 to step 116, client device 103 plays the media asset segment requested at the second segment bitrate.

At step 112, when client device 103 has proceeded from step 118, client device 103 requests, via the communication network, the media asset segment at the first segment bitrate, from server 105.

At step 114, when client device 103 has proceeded from step 118 through step 112 to step 114, server 105 sends, via the communication network, the media asset segment requested at the first segment bitrate, to user device 103.

At step 116, when client device 103 has proceeded from step 118 through step 114 to step 116, client device 103 plays the media asset segment requested at the first segment bitrate.

Figure 2:
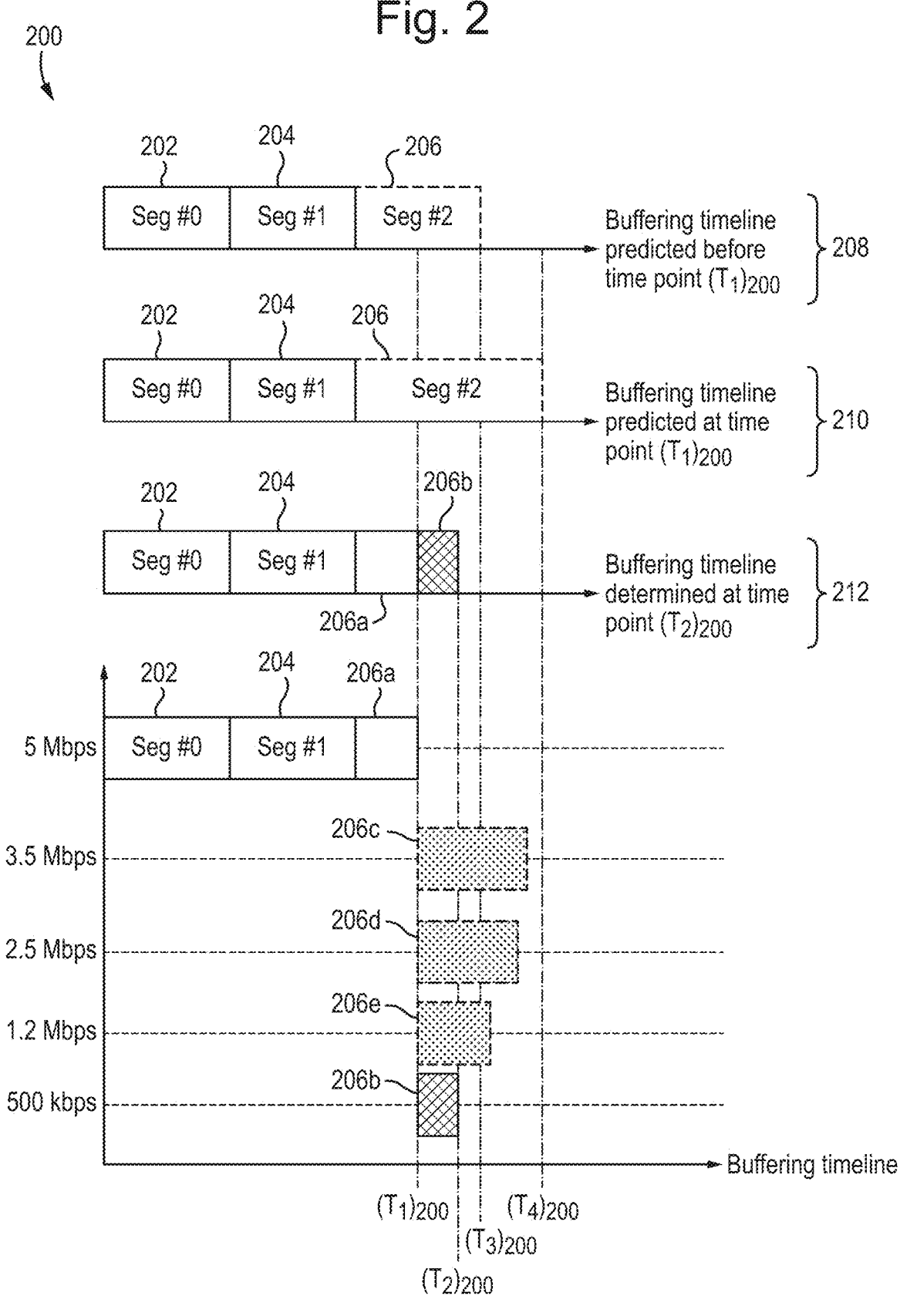
FIG. 2 depicts an example for bitrate selection in ABR streaming, that is not in accordance with the disclosure.

FIG. 2 depicts an example 200 for improving bitrate selection in ABR streaming, that is not in accordance with the disclosure. A client device is connected to a server, e.g., local or remote server, via a communication network (not shown) e.g., LAN or WAN. Upon a user input, the client device requests, from the server, an audio-visual media asset for playback. The server forwards, to the client device, a manifest relating to the media asset requested for playback. The client device then starts requesting media asset segments based on the manifest.

Before a time point $(T_1)_{200}$, the client device starts buffering a segment 206 requested, from a server, at a segment bitrate of 5 Mbps.

Before a time point $(T_1)_{200}$, the client device predicts, based on a current first bandwidth level, a buffering timeline 208, in which segment 206 is predicted to be entirely buffered at a time point $(T_3)_{200}$, at which segment 206 is to be presented on the client device.

At time point $(T_1)_{200}$, the client device predicts, based on a current second bandwidth level lower than the current first bandwidth level, a buffering timeline 210, in which segment 206 is predicted to be entirely buffered at a time point $(T_4)_{200}$ posterior to $(T_3)_{200}$. The client device then stops buffering segment 206 requested, from the server, at a segment bitrate of 5 Mbps. A portion 206a of segment 206 requested at the segment bitrate of 5 Mbps is not to be presented on the client device leading to a segment replacement. The client device then requests, from server, segment 206b at a segment bitrate of 500 kbps (lower than the initial segment bitrate of 5 Mbps) in order to have segment 206b entirely buffered at a time point $(T_2)_{200}$ anterior to time point $(T_3)_{200}$. Segment 206 and segment 206b represent a same segment but requested at different segment bitrates, each segment bitrate corresponding to an amount of compressed audio-visual data. The higher the segment bitrate, the higher the amount of compressed audio-visual data.

At time point $(T_2)_{200}$, the client device determines a buffering timeline 212, indicating the buffering of portion 206a of segment 206 and segment 206b: segment 206 has been replaced by segment 206b. The client device was unable to request a segment 206c at a segment bitrate of 3.5 Mbps, a segment 206d at a segment bitrate of 2.5 Mbps and a segment 206e at a segment bitrate of 1.2 Mbps. Segments 206, 206b, 206c, 206d and 206e represent a same segment but requested at different segment bitrates, each segment bitrate corresponding to an amount of compressed audio-visual data. The higher the segment bitrate, the higher the amount of compressed audio-visual data. The user consuming segment 206b may distinguish a difference of video quality between either of segments 202 and 204, and segment 206b, causing an audio-visual discomfort for the user: the QoE for the user is lowered. Had the client device predicted, sufficiently in advance of time point $(T_1)_{200}$, that segment 206 requested at a segment bitrate of 5 Mbps would have not been buffered prior to time point $(T_3)_{200}$, the client device would have been able to request and buffer in time segment 206e, segment 206d or even segment 206c. The resulting audio-visual discomfort, if any, would have been less than the audio-visual discomfort occurring when sequentially consuming segment 204 requested at 5 Mbps and segment 206b requested at 500 kbps.

Figure 3:
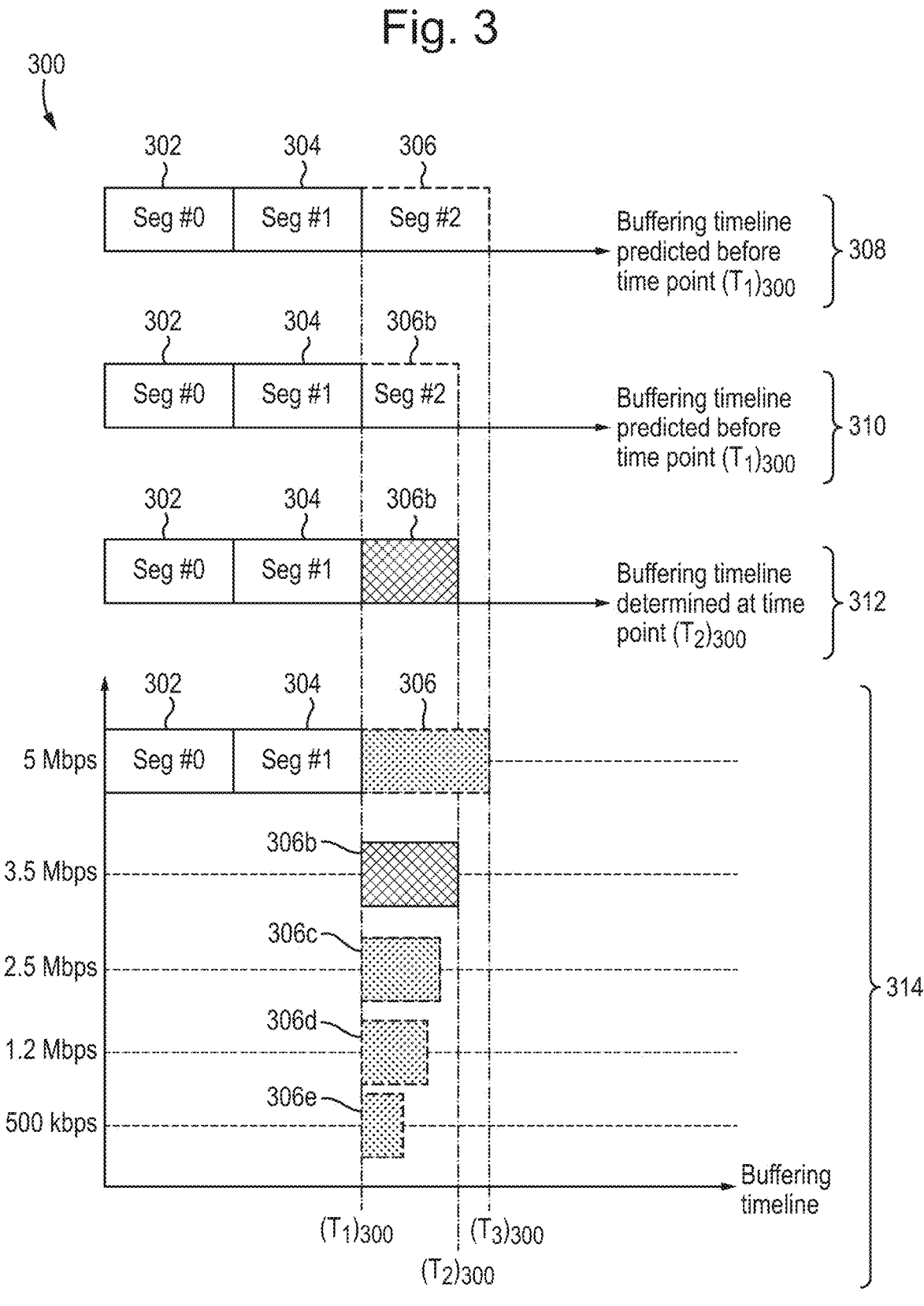
FIG. 3 shows an example for improving bitrate selection in ABR streaming, in accordance with some implementations of the disclosure.

FIG. 3 shows an example 300 for improving bitrate selection in ABR streaming, in accordance with some implementations of the disclosure. A client device (e.g., client device 103) is connected to a server (e.g., server 105), that is a local or remote server, via a communication network (not shown) e.g., LAN or WAN. Upon a user input, the client device requests, from the server, an audio-visual media asset for playback. The server forwards, to the client device, a manifest relating to the media asset requested for playback. The client device then starts requesting media asset segments based on the manifest.

Before a time point $(T_1)_{300}$, the client device (e.g., client device 103) starts buffering a segment 306 requested, from a server (e.g., server 105), at a segment bitrate of 5 Mbps.

Before a time point $(T_1)_{300}$, the client device predicts, based on a current first bandwidth level, multiple buffering timelines, each buffering timeline associated with an alternative segment (e.g., segment 306, segment 306b, segment 306c, segment 306d or segment 306e) representative of a same segment and requested at a respective segment bitrate (e.g., 5 Mbps, 3.5 Mbps, 2.5 Mbps, 1.2 Mbps or 500 kpbs). For instance, in buffering timeline 308, segment 306 is predicted to be entirely buffered at a time point $(T_3)_{300}$, at which segment 306 is to be presented on the client device. For instance, in buffering timeline 310, a segment 306b is predicted to be entirely buffered at a time point $(T_2)_{300}$, at which segment 306b is to be presented on the client device, wherein time point $(T_2)_{300}$ is anterior to time point $(T_3)_{300}$.

The client device determines the video quality (e.g., objective, perceived or estimated video quality) of the alternative segment, among segments 306, 306b, 306c, 306d and 306e, whose segment bitrate is the closest to and below the segment bitrate of the previously-requested segment 304 on ABR segment bitrate ladder 314. The alternative segment in question is alternative segment 306b. To determine the video quality of the alternative segment 306b, the client device retrieves, from a manifest related to the media asset requested for presentation, a value for each characteristic of a plurality of characteristics indicative of a video quality (e.g., segment bitrate, image resolution—i.e., width*height in pixels—, frame rate, image bit depth—i.e., color—, audio sample rate, sound bit depth—i.e., number of sound bits in each sample—) associated with the video quality of alternative segment 306b. The client device then feeds each value associated with a characteristic of the plurality of video quality-related characteristics of the segment into an algorithm to determine an objective video quality of the segment in question. In some instances, the algorithm comprises the assignment of a respective weight from a user profile to each value associated with a characteristic of the plurality of characteristics indicative of a video quality and the subsequent determination of the related weighted sum corresponding to a perceived video quality of the segment in question.

Furthermore, the client device retrieves, from a storage unit, the video quality '$Q_{PR}$' (e.g., objective, perceived or estimated video quality) of a previously-requested segment or determines the weighted video quality average, '$Q_{WA}$', of previously-requested segments (using the objective, perceived or estimated video qualities of the previously-requested segments) from the corresponding video qualities of the previously-requested segments stored in the storage unit. Additionally, the client device sets the video quality variation range following mathematical relationship (1) and the video quality variation 'Δ' to a value corresponding to a percentage of the video quality '$Q_{PR}$' of the previously-requested segment. Moreover, the client device may set the video quality variation 'Δ' to a value based on the type of the segment. Alternatively, the client device sets the video quality variation range following mathematical relationship (2) and the video quality variation 'Δ' to a value corresponding to a percentage of the weighted video quality average, '$Q_{WA}$', of previously-requested segments. Moreover, the client device may set the video quality variation 'Δ' to a value based on the type of the segment. Alternatively, the client device uses a machine learning model trained by multiple users to determine an estimated video quality of a segment of a media asset and uses mathematical relationship (1) or (2) to determine the video quality variation range.

The client device compares the video quality of the segment of the media content item requested at the second segment bitrate with the video quality variation range to determine that the video quality of the segment of the media content item requested at the second segment bitrate is within the video quality variation range or not. If the client device determines that the video quality of alternative segment 306b is within the video quality variation range, the client device requests alternative segment 306b as shown in buffering timeline 312. If the video quality of alternative segment 306b is not within the video quality variation range and if the client device predicts that segment 306 is to be buffered before segment 306 is due to be presented, the client device requests alternative segment 306.

Figure 4:
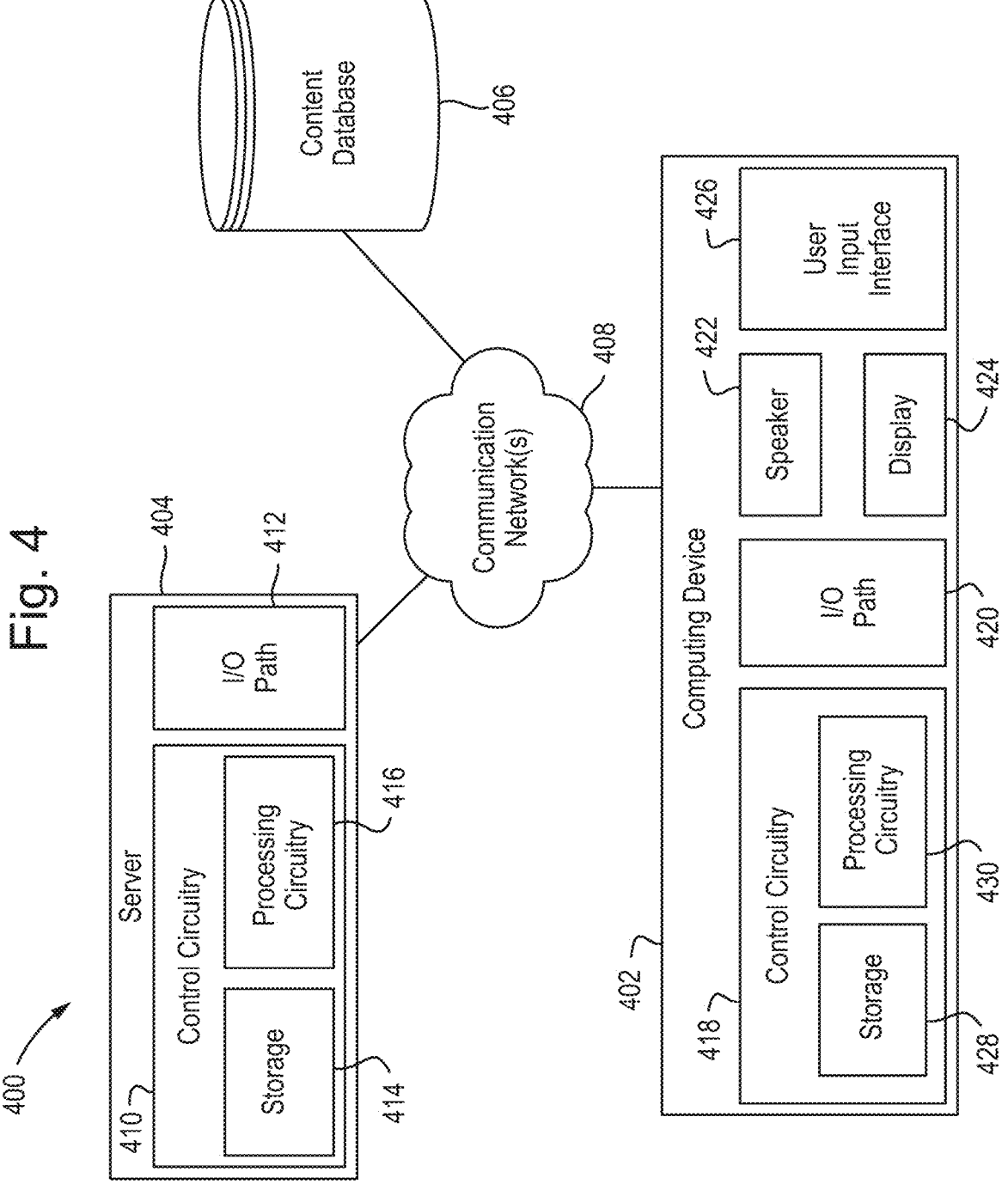
FIG. 4 illustrates a block diagram of an example system for improving bitrate selection in ABR streaming, in accordance with some implementations of the disclosure.

FIG. 4 illustrates a block diagram of an example system 400 for improving bitrate selection in ABR streaming, in accordance with some implementations of the disclosure.

Although FIG. 4 shows system 400 as including a number and configuration of individual components, in some examples, any number of the components of system 400 is combined and/or integrated as one device, e.g., as a user device used by a user to control an avatar participating in a multiuser event). System 400 includes computing device 402 (e.g., client device 103), server 404 (e.g., server 105), and content database 406 (e.g., database containing e.g., media content items, manifests relating to media content items), each of which is communicatively coupled to communication network 408, which is the Internet or any other suitable network or group of networks. In some examples, system 400 excludes server 404, and functionality that would otherwise be implemented by server 404 is instead implemented by other components of system 400, such as computing device 402. In still other examples, server 404 works in conjunction with computing device 402 to implement certain functionality described herein in a distributed or cooperative manner.

Server 404 includes control circuitry 410 and input/output (hereinafter "I/O") circuitry 412, and control circuitry 410 includes storage 414 and processing circuitry 416. Computing device 402, which can be a personal computer, a laptop computer, a tablet computer, a smartphone, a smart television, a smart speaker, or any other type of computing device, includes control circuitry 418, I/O circuitry 420, speaker 422, display 424, and user input interface 426, which in some examples provides a user selectable option for enabling and disabling the display of modified closed captions. Control circuitry 418 includes storage 428 and processing circuitry 430. Control circuitry 410 and/or 418 is based on any suitable processing circuitry such as processing circuitry 416 and/or 430. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores). In some examples, processing circuitry is distributed across multiple separate processors, for example, multiple of the same type of processors (e.g., two Intel Core i9 processors) or multiple different processors (e.g., an Intel Core i7 processor and an Intel Core i9 processor).

Each of storage 414, storage 428, and/or storages of other components of system 400 (e.g., storages of content database 406, and/or the like) is an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 414, storage 428, and/or storages of other components of system 400 is used to store various types of content, metadata, and or other types of data. Non-volatile memory also is used (e.g., to launch a boot-up routine and other instructions). Cloud-based storage is used to supplement storages 414, 428 or instead of storages 414, 428. In some examples, control circuitry 410 and/or 418 executes instructions for an application stored in memory (e.g., storage 414 and/or 428). Specifically, control circuitry 410 and/or 418 is instructed by the application to perform the functions discussed herein. In some implementations, any action performed by control circuitry 410 and/or 418 is based on instructions received from the application. For example, the application is implemented as software or a set of executable instructions that is stored in storage 414 and/or 428 and executed by control circuitry 410 and/or 418. In some examples, the application is a client/server application where only a client application resides on computing device 402, and a server application resides on server 404.

The application is implemented using any suitable architecture. For example, it is a stand-alone application wholly implemented on computing device 402. In such an approach, instructions for the application are stored locally (e.g., in storage 428), and data for use by the application is downloaded on a periodic basis (e.g., from an out-of-band feed, from an Internet resource, or using another suitable approach). Control circuitry 418 retrieves instructions for the application from storage 428 and process the instructions to perform the functionality described herein. Based on the processed instructions, control circuitry 418 determines what action to perform when input is received from user input interface 426.

In client/server-based examples, control circuitry 418 includes communication circuitry suitable for communicating with an application server (e.g., server 404) or other networks or servers. The instructions for carrying out the functionality described herein are stored on the application server. Communication circuitry includes a cable modem, an Ethernet card, or a wireless modem for communication with other equipment, or any other suitable communication circuitry. Such communication involves the Internet or any other suitable communication networks or paths (e.g., communication network 408). In another example of a client/server based application, control circuitry 418 runs a web browser that interprets web pages provided by a remote server (e.g., server 404). For example, the remote server stores the instructions for the application in a storage device. The remote server processes the stored instructions using circuitry (e.g., control circuitry 410) and/or generates displays. Computing device 402 receives the displays generated by the remote server and displays the content of the displays locally via display 424. This way, the processing of the instructions is performed remotely (e.g., by server 404) while the resulting displays are provided locally on computing device 402. Computing device 402 receives inputs from the user via input interface 426 and transmits those inputs to the remote server for processing and generating the corresponding displays.

A user sends instructions, e.g., to view an interactive media content item and/or selects one or more programming options of the interactive media content item, to control circuitry 410 and/or 418 using user input interface 426. User input interface 426 is any suitable user interface, such as a remote control, trackball, keypad, keyboard, touchscreen, touchpad, stylus input, joystick, speech recognition interface, gaming controller, or other user input interfaces. User input interface 426 is integrated with or combined with display 424, which can be a monitor, a television, a liquid crystal display (LCD), an electronic ink display, or any other equipment suitable for displaying visual images.

Server 404 and computing device 402 transmits and receives content and data via I/O circuitry 412 and 420, respectively. For instance, I/O circuitry 412 and/or I/O circuitry 420 includes a communication port(s) configured to transmit and/or receive (for instance to and/or from content database 406), via communication network 408, content item identifiers, content metadata, natural language queries, and/or other data. Control circuitry 410, 418 is used to send and receive commands, requests, and other suitable data using I/O circuitry 412, 420. I/O circuitry 412 of server 404 and I/O circuitry 420 of computing device 402 each comprises I/O circuitry e.g., network interface, port, bus, wire.

FIG. 5 represents a flowchart describing an example 500 for improving bitrate selection in ABR streaming, in accordance with some implementations of the disclosure.

At step 502, control circuitry of a client device (e.g., client device 103) determines a first segment bitrate for a segment of a media content item based on an available bandwidth. In some instances, at step 502, the control circuitry of the client device retrieves at least one past bandwidth during the ABR streaming and determines the available bandwidth based on the at least one past bandwidth.

At step 504, the control circuitry of the client device determines that a second segment bitrate is available, the second segment bitrate being lower than the first segment bitrate. At step 504, additionally, the control circuitry of the client device accesses a manifest comprising information about a plurality of segments of the media content item, retrieves, from the manifest, at least one available segment bitrate related to the segment of the media content item, determines, among the at least one available segment bitrate, a highest available segment bitrate that does not exceed the available bandwidth, and sets the highest available segment bitrate as the first segment bitrate. At step 504, furthermore, the control circuitry of the client device accesses a manifest comprising information about a plurality of segments of the media content item, retrieves, from the manifest, multiple available segment bitrates related to the segment, determines, among the multiple available segment bitrates, a first available segment bitrate that does not exceed the available bandwidth, determines, among the at least multiple segment bitrates, a second available segment bitrate that does not exceed the available bandwidth, wherein the second available segment bitrate is lower than the first available segment bitrate, and sets the second available segment bitrate as the second segment bitrate.

At step 506, the control circuitry of the client device determines that a video quality (e.g., objective, perceived or estimated video quality) of the segment of the media content item requested at the second segment bitrate is within a video quality variation range. At step 506, additionally, the control circuitry of the client device retrieves, from a manifest relating to the media content item requested for presentation, a plurality of characteristics of the segment in question, indicative of a video quality, such as image resolution (width*height in pixels), frame rate, image bit depth (color), audio sample rate, sound bit depth (number of bits in each sample), etc., then feeds each value associated with a characteristic of the plurality of video quality-related characteristics of the segment into an algorithm to determine an objective video quality of the segment in question. In some instances, the algorithm comprises the assignment of a respective weight from a user profile to each value associated with a characteristic of the plurality of characteristics indicative of a video quality and the subsequent determination of the related weighted sum corresponding to a perceived video quality of the segment in question. At step 506, furthermore, the control circuitry of the client device retrieves, from a storage unit, the video quality ‘$Q_{PR}$’ (e.g., objective, perceived or estimated video quality) of a previously-requested segment or determines the weighted video quality average, ‘$Q_{WA}$’, of previously-requested segments from the corresponding video qualities (e.g., objective, perceived or estimated video qualities) of the previously-requested segments stored in the storage unit. At step 506, moreover, the control circuitry of the client device sets the video quality variation range following mathematical relationship (1) and the video quality variation ‘$\Delta$’ to a value corresponding to a percentage of the video quality ‘$Q_{PR}$’ of the previously-requested segment and sets the video quality variation ‘$\Delta$’ to a value based on the type of the segment. At step 506, alternatively, the control circuitry of the client device sets the video quality variation range following mathematical relationship (2) and the video quality variation ‘$\Delta$’ to a value corresponding to a percentage of the weighted video quality average, ‘$Q_{WA}$’, of previously-requested segments. At step 506, the control circuitry of the client device may set the video quality variation ‘$\Delta$’ to a value based on the type of the segment. At step 506, alternatively, the control circuitry of the client device uses a machine learning model trained by multiple users to determine an estimated video quality of a segment of a media asset and uses mathematical relationship (1) or (2) to determine the video quality variation range. At step 506, finally, the control circuitry of the client device compares the video quality of the segment of the media content item requested at the second segment bitrate with the video quality variation range to determine that the video quality of the segment of the media content item requested at the second segment bitrate is within the video quality variation range or not.

At step 508, the control circuitry of the client device requests, based on the determining that the video quality (e.g., objective, perceived or estimated video quality) of the segment of the media content item requested at the second segment bitrate is within the video quality variation range, the segment of the media content item at the second segment bitrate.

Figure 6:
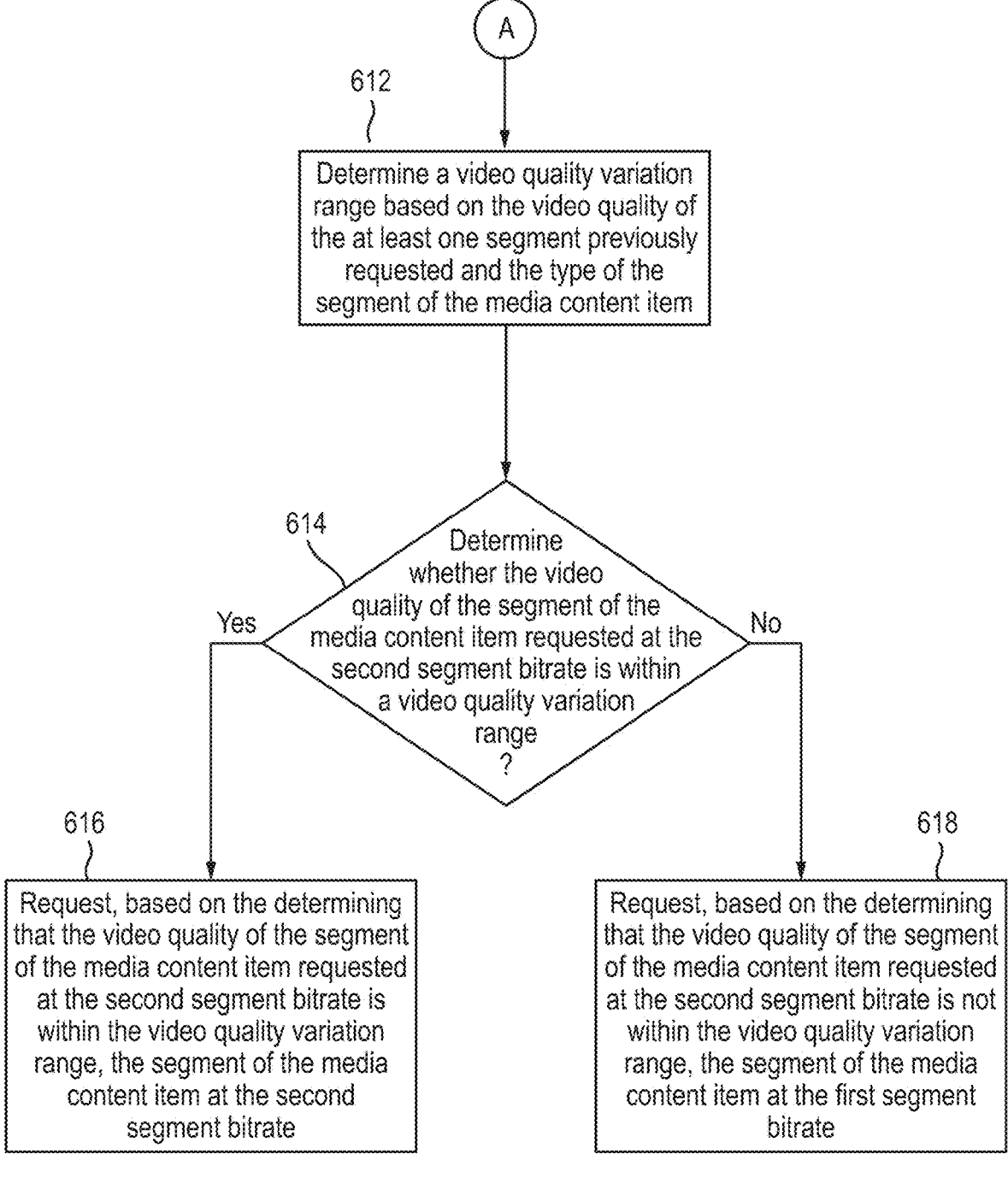
FIG. 6 depicts a flowchart describing an example for improving bitrate selection in ABR streaming, in accordance with some implementations of the disclosure.

FIG. 6 depicts a flowchart describing an example 600 for improving bitrate selection in ABR streaming, in accordance with some implementations of the disclosure.

At step 602, control circuitry of a client device (e.g., client device 103) determines a first segment bitrate for a segment of a media content item based on an available bandwidth. In some instances, at step 602, additionally, the control circuitry of the client device retrieves at least one past bandwidth during the ABR streaming and determines the available bandwidth based on the at least one past bandwidth.

At step 604, the control circuitry of the client device determines that a second segment bitrate is available, the second segment bitrate being lower than the first segment bitrate. At step 604, additionally, the control circuitry of the client device accesses a manifest comprising information about a plurality of segments of the media content item, retrieves, from the manifest, at least one available segment bitrate related to the segment of the media content item, determines, among the at least one available segment bitrate, a highest available segment bitrate that does not exceed the available bandwidth, and sets the highest available segment bitrate as the first segment bitrate. At step 604, furthermore, the control circuitry of the client device accesses a manifest comprising information about a plurality of segments of the media content item, retrieves, from the manifest, multiple available segment bitrates related to the segment, determines, among the multiple available segment bitrates, a first available segment bitrate that does not exceed the available bandwidth, determines, among the at least multiple segment bitrates, a second available segment bitrate that does not exceed the available bandwidth, wherein the second available segment bitrate is lower than the first available segment bitrate, and sets the second available segment bitrate as the second segment bitrate.

At step 606, the control circuitry of the client device determines a video quality (e.g., objective, perceived or estimated video quality) of the segment of the media content item requested at the second segment bitrate. At step 606, additionally, the control circuitry of the client device retrieves, from a manifest relating to the media content item requested for presentation, a plurality of characteristics of the segment in question, indicative of a video quality, such as image resolution (width*height in pixels), frame rate, image bit depth (color), audio sample rate, sound bit depth (number of bits in each sample), etc., then feeds each value associated with a characteristic of the plurality of video quality-related characteristics of the segment into an algorithm to determine an objective video quality of the segment in question. In some instances, the algorithm comprises the assignment of a respective weight from a user profile to each value associated with a characteristic of the plurality of characteristics indicative of a video quality and the subsequent determination of the related weighted sum corresponding to a perceived video quality of the segment in question. In some instances, the control circuitry of the client device stores the video quality of the segment of the media content item in a storage unit for a subsequent use (e.g., determination of the video quality variation range of a segment to be subsequently requested). At step 606, alternatively, the control circuitry of the client device uses a machine learning model trained by multiple users to determine an estimated video quality of a segment of a media asset.

At step 608, the control circuitry of the client device retrieves, from a manifest comprising information about a plurality of segments of the media content item, a video quality (e.g., objective, perceived or estimated video quality) of at least one segment previously requested. At step 608, alternatively, the control circuitry of the client device retrieves, from a storage unit storing video quality (e.g., objective, perceived or estimated video quality) of each segment of a plurality of segments of the media content item that have been previously requested and e.g., played, a video quality (e.g., objective, perceived or estimated video quality) of at least one segment previously requested and e.g., played. At step 608, the control circuitry of the client device proceeds to step 610 when the control circuitry of the client device has access to information relating to the type of the segments of the media content item requested for presentation.

At step 610, the control circuitry of the client device determines a type of the segment of the media content item. In some instances, the client device analyzes, using a machine learning model having image recognition capabilities, a segment to determine the dominant presence of audio-visual elements and categorize the segment into a segment type (e.g., action sequence, static shot, detailed scene, simple scene, main content e.g., requested by a user or supplemental content e.g., imposed to the user). At step 610, alternatively, the control circuitry of the client device retrieves, from a manifest relating to the media content item requested for presentation, a type of the segment of the media content item.

At step 612, the control circuitry of the client device determines a video quality variation range based on the video quality of the at least one segment previously requested e.g., that has been played and the type of the segment of the media content item. To do so, at step 612, the control circuitry of the client device retrieves, from a storage unit, the video quality (e.g., objective, perceived or estimated video quality) '$Q_{PR}$' of a previously-requested segment or determines the weighted video quality average, '$Q_{WA}$', of previously-requested segments from the corresponding video qualities (e.g., objective, perceived or estimated video qualities) of the previously-requested segments stored in the storage unit. At step 612, additionally, the control circuitry of the client device sets the video quality variation range following mathematical relationship (1) and the video quality variation '$\Delta$' to a value corresponding to a percentage of the video quality '$Q_{PR}$' of the previously-requested segment based on the type of the segment. At step 612, additionally, the control circuitry of the client device may set the video quality variation '$\Delta$' to a value based on the type of the segment. At step 612, alternatively, the control circuitry of the client device sets the video quality variation range following mathematical relationship (2) and the video quality variation '$\Delta$' to a value corresponding to a percentage of the weighted video quality average, '$Q_{WA}$', of previously-requested segments, based on the type of the segment. At step 612, additionally, the control circuitry of the client device may set the video quality variation 'Δ' to a value based on the type of the segment. At step 612, alternatively, the client device uses a machine learning model trained by multiple users to determine an estimated video quality of a segment of a media asset and uses mathematical relationship (1) or (2) to determine the video quality variation range.

At step 614, the control circuitry of the client device compares the video quality of the segment of the media content item requested at the second segment bitrate with the video quality variation range to determine that the video quality of the segment of the media content item requested at the second segment bitrate is within the video quality variation range or not. If so, the control circuitry of the client device proceeds to step 616. If not, the control circuitry of the client device proceeds to step 618.

At step 616, the control circuitry of the client device requests, based on the determining that the video quality (e.g., objective, perceived or estimated video quality) of the segment of the media content item requested at the second segment bitrate is within the video quality variation range, the segment of the media content item at the second segment bitrate.

At step 618, the control circuitry of the client device requests, based on the determining that the video quality (e.g., objective, perceived or estimated video quality) of the segment of the media content item requested at the second segment bitrate is not within the video quality variation range, the segment of the media content item at the first segment bitrate.

Figure 7:
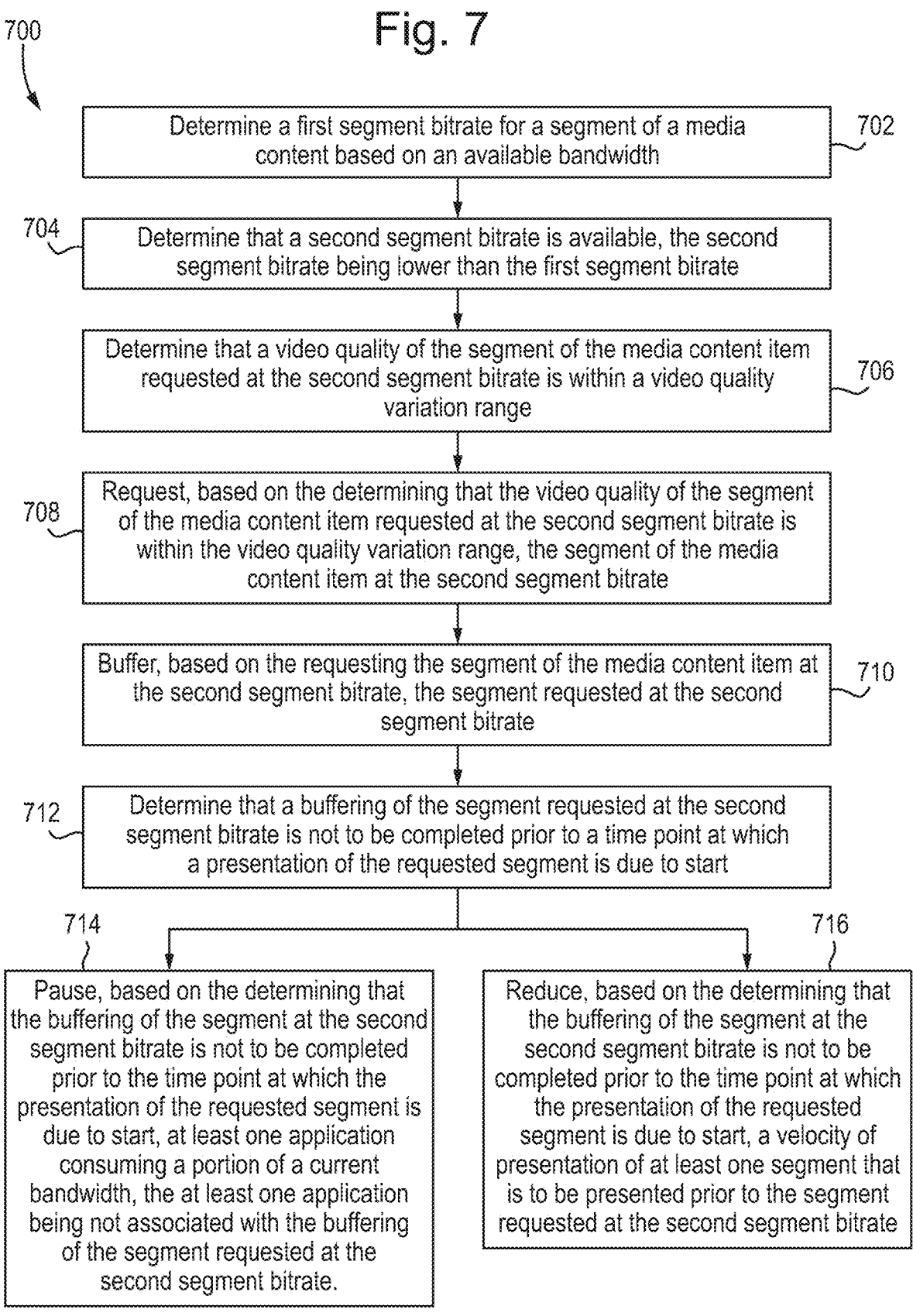
FIG. 7 shows a flowchart describing an example for improving bitrate selection in ABR streaming, in accordance with some implementations of the disclosure.

FIG. 7 depicts a flowchart describing an example 700 for improving bitrate selection in ABR streaming, in accordance with some implementations of the disclosure.

At step 702, control circuitry of a client device (e.g., client device 103) determines a first segment bitrate for a segment of a media content item based on an available bandwidth. At step 702, the control circuitry of the client device retrieves at least one past bandwidth during the ABR streaming and determines the available bandwidth based on the at least one past bandwidth.

At step 704, the control circuitry of the client device determines that a second segment bitrate is available, the second segment bitrate being lower than the first segment bitrate. At step 704, additionally, the control circuitry of the client device accesses a manifest comprising information about a plurality of segments of the media content item, retrieves, from the manifest, at least one available segment bitrate related to the segment of the media content item, determines, among the at least one available segment bitrate, a highest available segment bitrate that does not exceed the available bandwidth, and sets the highest available segment bitrate as the first segment bitrate. At step 704, furthermore, the control circuitry of the client device accesses a manifest comprising information about a plurality of segments of the media content item, retrieves, from the manifest, multiple available segment bitrates related to the segment, determines, among the multiple available segment bitrates, a first available segment bitrate that does not exceed the available bandwidth, determines, among the at least multiple segment bitrates, a second available segment bitrate that does not exceed the available bandwidth, wherein the second available segment bitrate is lower than the first available segment bitrate, and sets the second available segment bitrate as the second segment bitrate.

At step 706, the control circuitry of the client device determines that a video quality (e.g., objective, perceived or estimated video quality) of the segment of the media content item requested at the second segment bitrate is within a video quality variation range. At step 706, additionally, the control circuitry of the client device retrieves, from a manifest relating to the media content item requested for presentation, a plurality of characteristics of the segment in question, indicative of a video quality, such as image resolution (width*height in pixels), frame rate, image bit depth (color), audio sample rate, sound bit depth (number of bits in each sample), etc., then feeds each value associated with a characteristic of the plurality of video quality-related characteristics of the segment into an algorithm to determine an objective video quality of the segment in question. In some instances, the algorithm comprises the assignment of a respective weight from a user profile to each value associated with a characteristic of the plurality of characteristics indicative of a video quality and the subsequent determination of the related weighted sum corresponding to a perceived video quality of the segment in question. At step 706, alternatively, the control circuitry of the client device uses a machine learning model trained by multiple users to determine an estimated video quality of a segment of a media asset. At step 706, alternatively, the control circuitry of the client device retrieves, from a storage unit, the video quality (e.g., objective, perceived or estimated video quality) '$Q_{PR}$' of a previously-requested segment e.g., that has been played or determines the weighted video quality average, '$Q_{WA}$', of previously-requested segments from the corresponding video qualities (e.g., objective, perceived or estimated video qualities) of the previously-requested segments stored in the storage unit. At step 706, moreover, the control circuitry of the client device sets the video quality variation range following mathematical relationship (1) and the video quality variation 'Δ' to a value corresponding to a percentage of the video quality '$Q_{PR}$' of the previously-requested segment. At step 706, additionally, the control circuitry of the client device may set the video quality variation 'Δ' based on the type of the segment. At step 706, alternatively, the control circuitry of the client device sets the video quality variation range following mathematical relationship (2) and the video quality variation 'Δ' to a value corresponding to a percentage of the weighted video quality average, '$Q_{WA}$', of previously-requested segments. At step 706, additionally, the control circuitry of the client device may set the video quality variation 'Δ' to a value based on the type of the segment. At step 706, alternatively, the client device uses a machine learning model trained by multiple users to determine an estimated video quality of a segment of a media asset and uses mathematical relationship (1) or (2) to determine the video quality variation range. At step 706, finally, the control circuitry of the client device compares the video quality (e.g., objective, perceived or estimated video quality) of the segment of the media content item requested at the second segment bitrate with the video quality variation range to determine that the video quality of the segment of the media content item requested at the second segment bitrate is within the video quality variation range or not.

At step 708, the control circuitry of the client device requests, based on the determining that the video quality (e.g., objective, perceived or estimated video quality) of the segment of the media content item requested at the second segment bitrate is within the video quality variation range, the segment of the media content item at the second segment bitrate.

At step 710, the control circuitry of the client device buffers, based on the requesting the segment of the media content item at the second segment bitrate, the segment requested at the second segment bitrate.

At step 712, the control circuitry of the client device determines that a buffering of the segment requested at the second segment bitrate is not to be completed prior to a time point at which a presentation of the requested segment is due to start. At step 712, the control circuitry of the client device may proceed to step 714 or step 716. At step 712, alternatively, the control circuitry of the client device may sequentially proceeds one of steps 714 and 716, then to the other one of steps 714 and 716.

At step 714, the control circuitry of the client device pauses, based on the determining that the buffering of the segment at the second segment bitrate is not to be completed prior to the time point at which the presentation of the requested segment is due to start, at least one application consuming a portion of a current bandwidth, the at least one application being not associated with the buffering of the segment requested at the second segment bitrate.

At step 716, the control circuitry of the client device reduces, based on the determining that the buffering of the segment at the second segment bitrate is not to be completed prior to the time point at which the presentation of the requested segment is due to start, a velocity of presentation of at least one segment that is to be presented prior to the segment requested at the second segment bitrate.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for requesting a segment of a media content item using adaptive bitrate (ABR) streaming, the method comprising:
   determining a first segment bitrate based on an available bandwidth;
   determining that a second segment bitrate is available, the second segment bitrate being lower than the first segment bitrate;
   determining that a video quality of the segment of the media content item requested at the second segment bitrate is within a video quality variation range;
   requesting, based on the determining that the video quality of the segment of the media content item requested at the second segment bitrate is within the video quality variation range, the segment of the media content item at the second segment bitrate;
   buffering, based on the requesting the segment of the media content item at the second segment bitrate, the segment requested at the second segment bitrate;

determining that a buffering of the segment requested at the second segment bitrate is not to be completed prior to a time point at which a presentation of the requested segment is due to start; and
   pausing, based on the determining that the buffering of the segment at the second segment bitrate is not to be completed prior to the time point at which the presentation of the requested segment is due to start, at least one application consuming a portion of a current bandwidth, the at least one application being not associated with the buffering of the segment requested at the second segment bitrate.

2. The method of claim 1, wherein the segment is a first segment, the method further comprising:
   determining that, for a second segment, a video quality of the second segment of the media content item associated with the second segment bitrate is not within a video quality variation range for the second segment; and
   requesting the second segment of the media content item at the first segment bitrate, based on determining that, for the second segment, the video quality of the second segment of the media content item associated with the second segment bitrate is not within the video quality variation range for the second segment.

3. The method of claim 1, wherein the determining the first segment bitrate at the available bandwidth further comprises:
   accessing a manifest comprising information about a plurality of segments of the media content item;
   retrieving, from the manifest, at least one available segment bitrate related to the segment of the media content item;
   determining, among the at least one available segment bitrate, a highest available segment bitrate that does not exceed the available bandwidth; and
   setting the highest available segment bitrate as the first segment bitrate.

4. The method of claim 1, wherein the determining that the second bitrate is available further comprises:
   accessing a manifest comprising information about a plurality of segments of the media content item;
   retrieving, from the manifest, multiple available segment bitrates related to the segment;
   determining, among the multiple available segment bitrates, a first available segment bitrate that does not exceed the available bandwidth;
   determining, among the multiple available segment bitrates, a second available segment bitrate that does not exceed the available bandwidth, wherein the second available segment bitrate is lower than the first available segment bitrate; and
   setting the second available segment bitrate as the second segment bitrate.

5. The method of claim 1, further comprising:
   retrieving, from a manifest comprising information about a plurality of segments of the media content item, a video quality of at least one segment previously requested; and
   determining the video quality variation range based on the video quality of the at least one segment previously requested.

6. The method of claim 1, the method further comprising:
   determining a type of the segment of the media content item; and
   determining the video quality variation range based on the type of the segment of the media content item.

7. The method of claim 1, further comprising:

assigning a first estimated video quality to a segment previously consumed;

assigning a second estimated video quality to the segment previously consumed; and determining the video quality variation range based on a difference between the first estimated video quality and the second estimated video quality.

8. The method of claim 1, further comprising:

buffering, based on the determining that the buffering of the segment at the second segment bitrate is not to be completed prior to the time point at which a presentation of the segment is due to start, the segment requested at a third segment bitrate, the third segment bitrate being lower than the second segment bitrate.

9. The method of claim 1, further comprising:

reducing, based on the determining that the buffering of the segment at the second segment bitrate is not to be completed prior to the time point at which the presentation of the requested segment is due to start, a velocity of presentation of at least one segment that is to be presented prior to the segment requested at the second segment bitrate.

10. The method of claim 1, wherein requesting the segment of the media content item at the second segment bitrate is based at least in part on determining that an amount of motion in the segment does not exceed a threshold.

11. A system for requesting a segment of a media content item using adaptive bitrate (ABR) streaming, the system comprising:

control circuitry configured to:

determine a first segment bitrate based on an available bandwidth;

determine that a second segment bitrate is available, the second segment bitrate being lower than the first segment bitrate;

determine that a video quality of the segment of the media content item requested at the second segment bitrate is within a video quality variation range;

request, based on the determining that the video quality of the segment of the media content item requested at the second segment bitrate is within the video quality variation range, the segment of the media content item at the second segment bitrate;

buffer, based on the requesting the segment of the media content item at the second segment bitrate, the segment requested at the second segment bitrate;

determine that a buffering of the segment requested at the second segment bitrate is not to be completed prior to a time point at which a presentation of the requested segment is due to start; and pause, based on the determining that the buffering of the segment at the second segment bitrate is not to be completed prior to the time point at which the presentation of the requested segment is due to start, at least one application consuming a portion of a current bandwidth, the at least one application being not associated with the buffering of the segment requested at the second segment bitrate.

12. The system of claim 11, wherein the segment is a first segment, and the control circuitry is further configured to:

determine that, for a second segment, a video quality of the second segment of the media content item associated with the second segment bitrate is not within a video quality variation range for the second segment; and request the second segment of the media content item at the first segment bitrate, based on determining that, for the second segment, the video quality of the second segment of the media content item associated with the second segment bitrate is not within the video quality variation range for the second segment.

13. The system of claim 11, wherein the control circuitry is further configured to determine the first segment bitrate at the available bandwidth by:

accessing a manifest comprising information about a plurality of segments of the media content item;

retrieving, from the manifest, at least one available segment bitrate related to the segment of the media content item;

determining, among the at least one available segment bitrate, a highest available segment bitrate that does not exceed the available bandwidth; and setting the highest available segment bitrate as the first segment bitrate.

14. The system of claim 11, wherein the control circuitry is further configured to determine that the second bitrate is available by:

accessing a manifest comprising information about a plurality of segments of the media content item;

retrieving, from the manifest, multiple available segment bitrates related to the segment;

determining, among the multiple available segment bitrates, a first available segment bitrate that does not exceed the available bandwidth;

determining, among the multiple available segment bitrates, a second available segment bitrate that does not exceed the available bandwidth, wherein the second available segment bitrate is lower than the first available segment bitrate; and setting the second available segment bitrate as the second segment bitrate.

15. The system of claim 11, wherein the control circuitry is further configured to:

retrieve, from a manifest comprising information about a plurality of segments of the media content item, a video quality of at least one segment previously requested; and determine the video quality variation range based on the video quality of the at least one segment previously requested.

16. The system of claim 11, wherein the control circuitry is further configured to:

determine a type of the segment of the media content item; and determine the video quality variation range based on the type of the segment of the media content item.

17. The system of claim 11, wherein the control circuitry is further configured to:

assign a first estimated video quality to a segment previously consumed;

assign a second estimated video quality to the segment previously consumed; and determine the video quality variation range based on a difference between the first estimated video quality and the second estimated video quality.

18. The system of claim 11, wherein the control circuitry is further configured to:

buffer, based on the determining that the buffering of the segment at the second segment bitrate is not to be completed prior to the time point at which a presentation of the segment is due to start, the segment requested at a third segment bitrate, the third segment bitrate being lower than the second segment bitrate.

19. The system of claim 11, wherein the control circuitry is further configured to:

reduce, based on the determining that the buffering of the segment at the second segment bitrate is not to be completed prior to the time point at which the presentation of the requested segment is due to start, a velocity of presentation of at least one segment that is to be presented prior to the segment requested at the second segment bitrate.

20. The system of claim 11, wherein the control circuitry, when requesting the segment at the second segment bitrate, is further configured to determine that an amount of motion in the segment does not exceed a threshold.

\* \* \* \* \*